(12) United States Patent
Tamura et al.

(10) Patent No.: US 10,100,418 B2
(45) Date of Patent: Oct. 16, 2018

(54) OXIDATION ELECTRODE AND PHOTOELECTROCHEMICAL DEVICE

(71) Applicant: KABUSHIKI KAISHA TOSHIBA, Minato-ku (JP)

(72) Inventors: Jun Tamura, Tokyo (JP); Satoshi Mikoshiba, Yamato (JP); Akihiko Ono, Tokyo (JP); Yuki Kudo, Yokohama (JP); Ryota Kitagawa, Tokyo (JP); Chingchun Huang, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 49 days.

(21) Appl. No.: 15/261,446

(22) Filed: Sep. 9, 2016

(65) Prior Publication Data

US 2016/0376717 A1    Dec. 29, 2016

Related U.S. Application Data

(63) Continuation of application No. PCT/JP2014/079975, filed on Nov. 12, 2014.

(30) Foreign Application Priority Data

Mar. 14, 2014    (JP) .................. 2014-051795

(51) Int. Cl.
  *C25B 1/00*     (2006.01)
  *C25B 9/18*     (2006.01)
  (Continued)

(52) U.S. Cl.
  CPC .......... *C25B 11/0489* (2013.01); *C25B 1/003* (2013.01); *C25B 1/10* (2013.01);
  (Continued)

(58) Field of Classification Search
  CPC .... C25B 1/00; C25B 9/00; C25B 9/18; C25B 11/03
  (Continued)

(56) References Cited

U.S. PATENT DOCUMENTS

2002/0050451 A1    5/2002    Ford et al.
2005/0014060 A1    1/2005    Suzuki
(Continued)

FOREIGN PATENT DOCUMENTS

JP    63-244565    10/1988
JP    2000-144466    5/2000
(Continued)

OTHER PUBLICATIONS

International Search Report dated Feb. 3, 2015 in PCT/JP2014/079975, filed on Nov. 12, 2014(with English Translation).
(Continued)

*Primary Examiner* — Zulmariam Mendez
(74) *Attorney, Agent, or Firm* — Oblon, McClelland, Maier & Neustadt, L.L.P.

(57) ABSTRACT

According to one embodiment, an oxidation electrode includes: a collector; an oxidation catalyst formed on the collector; and a modified organic molecule which is bonded to the surface of the oxidation catalyst, and comprises a cationic functional group.

20 Claims, 11 Drawing Sheets

(51) Int. Cl.
  *C25B 9/00* (2006.01)
  *C25B 11/04* (2006.01)
  *C25B 3/04* (2006.01)
  *C25B 1/10* (2006.01)
  *C25B 9/08* (2006.01)

(52) U.S. Cl.
  CPC ............... *C25B 3/04* (2013.01); *C25B 9/08* (2013.01); *Y02E 60/366* (2013.01); *Y02P 20/135* (2015.11)

(58) Field of Classification Search
  USPC .................................................. 204/242, 246
  See application file for complete search history.

(56) References Cited

U.S. PATENT DOCUMENTS

| | | | |
|---|---|---|---|
| 2010/0101955 A1* | 4/2010 | Nocera | ............ C25B 1/04 204/547 |
| 2010/0209814 A1 | 8/2010 | Suzuki et al. | |
| 2013/0269802 A1 | 10/2013 | Hwang et al. | |
| 2014/0131197 A1 | 5/2014 | Suzuka et al. | |
| 2015/0090604 A1 | 4/2015 | Artero et al. | |
| 2015/0252482 A1 | 9/2015 | Ono et al. | |
| 2015/0252483 A1 | 9/2015 | Ono et al. | |
| 2016/0076158 A1 | 3/2016 | Tamura et al. | |
| 2016/0076159 A1 | 3/2016 | Huang et al. | |
| 2016/0108527 A1 | 4/2016 | Kudo et al. | |

FOREIGN PATENT DOCUMENTS

| | | | |
|---|---|---|---|
| JP | 2002-113468 A | 4/2002 | |
| JP | 2003-288955 A | 10/2003 | |
| JP | 2007-73234 A | 3/2007 | |
| JP | 2010-188243 A | 9/2010 | |
| JP | 2011-94194 A | 5/2011 | |
| JP | 4980277 B2 | 7/2012 | |
| JP | 2012-167045 A | 9/2012 | |
| JP | 2013-113438 A | 6/2013 | |
| JP | 2013-114901 | 6/2013 | |
| JP | 2013-201066 A | 10/2013 | |
| JP | 2014-101550 A | 6/2014 | |
| JP | 2014-101551 A | 6/2014 | |
| JP | 2014-175245 A | 9/2014 | |
| JP | 2014-233669 A | 12/2014 | |
| JP | 2015-14016 A | 1/2015 | |
| JP | 2015-132012 A | 7/2015 | |
| WO | WO 2004/040679 A1 | 5/2004 | |
| WO | WO 2012/164913 A1 | 12/2012 | |
| WO | WO 2013/150116 A1 | 10/2013 | |
| WO | WO 2014/192891 A1 | 12/2014 | |

OTHER PUBLICATIONS

Written Opinion dated Feb. 3, 2015 in PCT/JP2014/079975, filed on Nov. 12, 2014.

Japanese Office Action dated Jul. 4, 2017 in Japanese Patent Application No. 2014-051795.

International Preliminary Report on Patentability and Written Opinion dated Oct. 4, 2016 in PCT/JP2014/079975 (submitting English language translation only).

Steven Y. Reece, et al., "Wireless Solar Water Splitting Using Silicon-Based Semiconductors and Earth-Abundant Catalysts" Science, vol. 334, Issue 6056, Nov. 4, 2011, pp. 645-648.

Yu Sun, et al., "Photoelectrochemical Reduction of Carbon Dioxide at Si(111) Electrode Modified by Viologen Molecular Layer with Metal Complex" Chemistry Letters, vol. 41, No. 3, Mar. 2012, pp. 328-330.

* cited by examiner

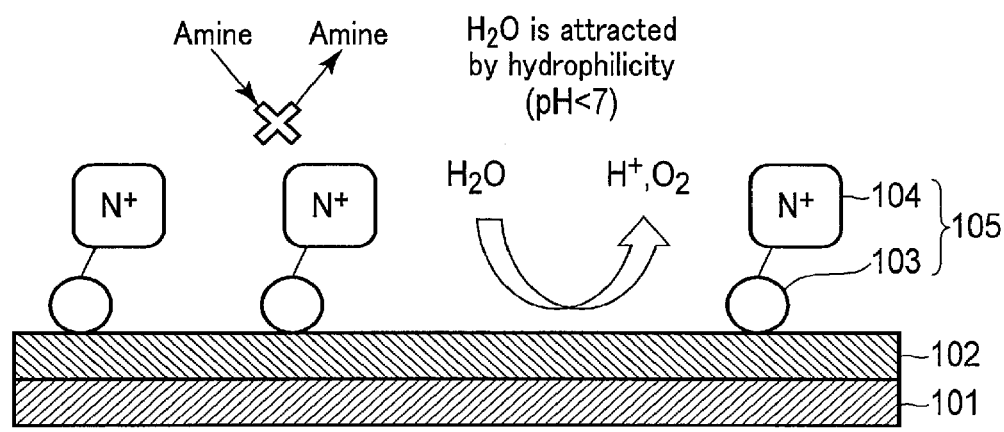
F I G. 4A
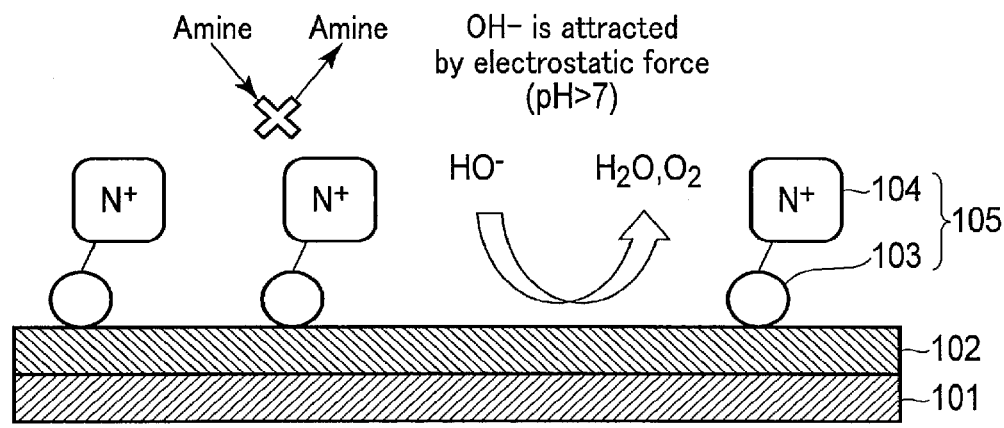
F I G. 4B

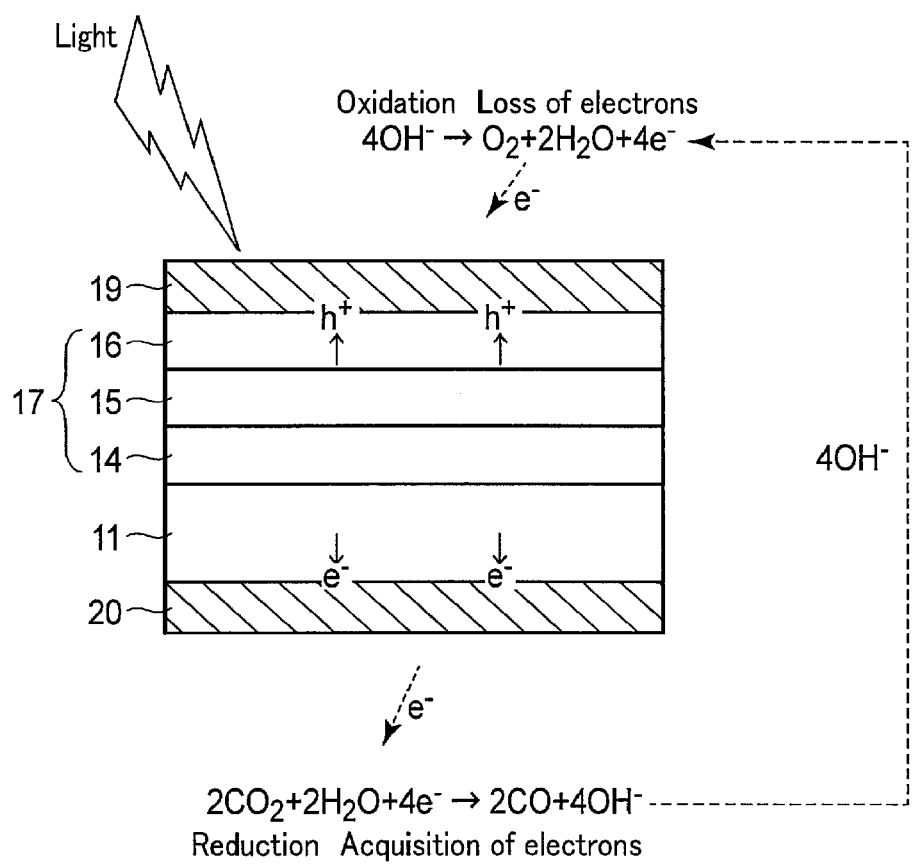
F I G. 7

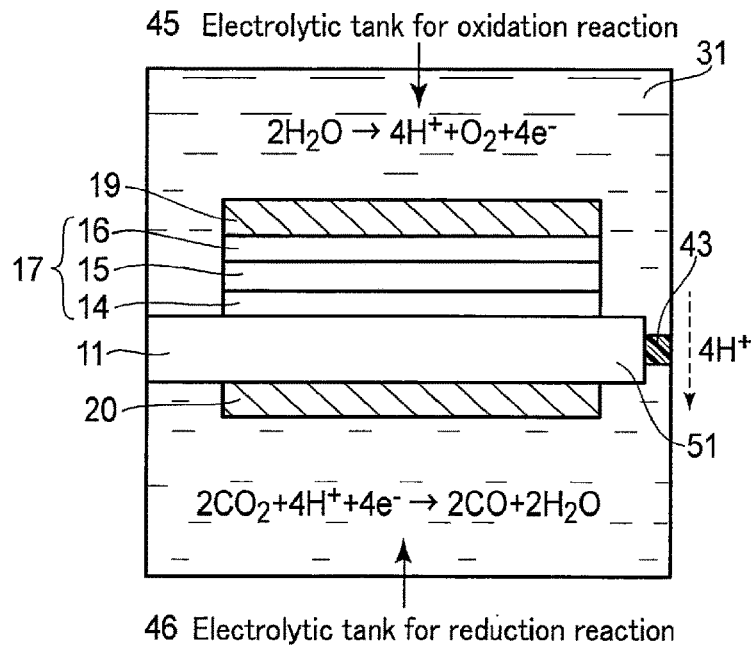
F I G. 10
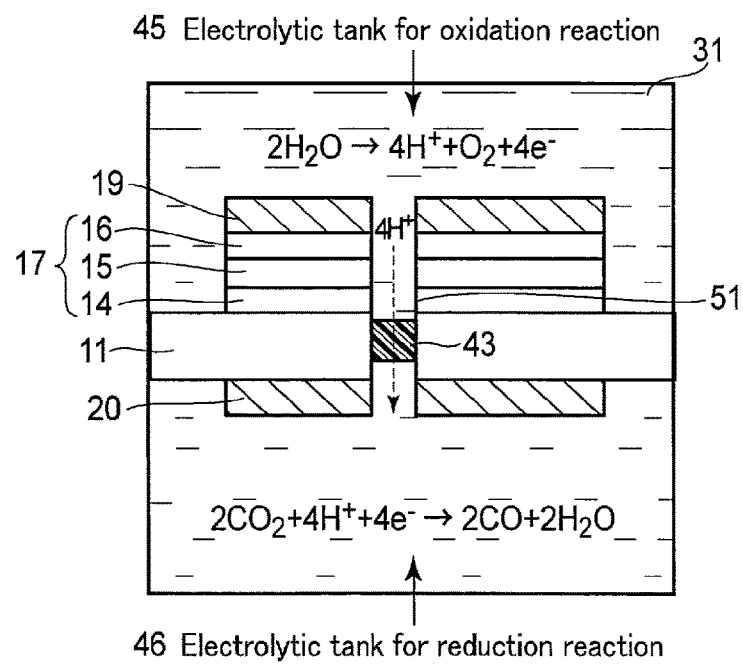
F I G. 11

| | Oxidation catalyst | Modified organic molecule | Potential (V vs.NHE) @1mA/cm$^2$ |
|---|---|---|---|
| Example 1 | Ni-O | N-trimethoxysilylpropyl-N,N, N-trimethylammonium tetrafluoroborate | 1.67 |
| Example 2 | Ni-O | 1-methyl-3-(2-triethoxysilylethyl) imidazolium tetrafluoroborate | 1.51 |
| Example 3 | Ni-O | 1-methyl-4-(2-triethoxysilylethyl) pyridinium tetrafluoroborate | 1.53 |
| Example 4 | Ni-O | 1-methyl-1-(2-triethoxysilylethyl) piperidinium tetrafluoroborate | 1.62 |
| Example 5 | Ni-O | 1-methyl-1-(2-triethoxysilylethyl) pyrrolidinium tetrafluoroborate | 1.60 |
| Example 6 | Ni-O | 1-hexyl-3-(2-triethoxysilylethyl) imidazolium tetrafluoroborate | 1.63 |
| Example 7 | Ni-O | 1-dodecyl-3-(2-triethoxysilylethyl) imidazolium tetrafluoroborate | 1.66 |
| Example 8 | Ni-O | 1-octadecyl-3-(2-triethoxysilylethyl) imidazolium tetrafluoroborate | 1.68 |
| Example 9 | Ni-O | Aminopropyltrimethoxysilane | 1.69 |
| Comparative example 1 | Ni-O | - | 1.71 |

F I G. 12

|  | Oxidation catalyst | Modified organic molecule | Potential(V vs.NHE) @1mA/cm2 |
|---|---|---|---|
| Example 10 | Co-O | 1-(2-ethylphosphonyl)-3-methylimidazolium tetrafluoroborate | 1.51 |
| Example 11 | Co-O | 1-ethyl-3-(2-ethylphosphonyl)imidazolium tetrafluoroborate | 1.56 |
| Example 12 | Co-O | 1-butyl-3-(2-ethylphosphonyl)imidazolium tetrafluoroborate | 1.61 |
| Example 13 | Co-O | 1-(2-ethylphosphonyl)-3-hexylimidazolium tetrafluoroborate | 1.64 |
| Example 14 | Co-O | 1-(2-ethylphosphonyl)-3-octylimidazolium tetrafluoroborate | 1.66 |
| Example 15 | Co-O | 1-dodecyl-3-(2-ethylphosphonyl)imidazolium tetrafluoroborate | 1.68 |
| Example 16 | Co-O | 1-(2-ethylphosphonyl)-3-octadecylimidazolium tetrafluoroborate | 1.70 |
| Comparative example 2 | Co-O | – | 1.76 |

F I G. 13

| | Oxidation catalyst | Modified organic molecule | Potential (V vs.NHE) @1mA/cm2 |
|---|---|---|---|
| Example 17 | Mn-O | 1-methyl-4-(2-triethoxysilylethyl) pyridinium tetrafluoroborate | 1.68 |
| Example 18 | Mn-O | 1-ethyl-4-(2-triethoxysilylethyl) pyridinium chloride | 1.63 |
| Example 19 | Mn-O | 1-hexyl-4-(2-triethoxysilylethyl) pyridinium dicyanamide | 1.71 |
| Example 20 | Mn-O | 1-octyl-4-(2-triethoxysilylethyl) pyridinium hydrogencarbonate | 1.74 |
| Example 21 | Mn-O | 1-dodecyl-4-(2-triethoxysilylethyl) pyridinium nitrate | 1.76 |
| Example 22 | Mn-O | 1-octadecyl-4-(2-triethoxysilylethyl) pyridinium nitrate | 1.73 |
| Example 23 | Mn-O | 1-methyl-4-(2-triethoxysilylethyl) pyridinium borate | 1.77 |
| Example 24 | Mn-O | 1-ethyl-4-(2-triethoxysilylethyl) pyridinium phosphate | 1.75 |
| Example 25 | Mn-O | 1-hexyl-4-(2-triethoxysilylethyl) pyridinium perchlorate | 1.80 |
| Comparative example 3 | Mn-O | - | 1.83 |

FIG. 14

| | Oxidation catalyst | Modified organic molecule | Potential (V vs.NHE) @1mA/cm2 |
|---|---|---|---|
| Example 26 | Mn-O | 1-(2-ethylphosphonyl)-1-octadecylpiperidinium hydrogencarbonate | 1.80 |
| Example 27 | Fe-O | 1-(2-ethylphosphonyl)-1-octadecylpiperidinium hydrogencarbonate | 1.89 |
| Example 28 | Co-O | 1-(2-ethylphosphonyl)-1-octadecylpiperidinium hydrogencarbonate | 1.76 |
| Example 29 | Ni-O | 1-(2-ethylphosphonyl)-1-octadecylpiperidinium hydrogencarbonate | 1.68 |
| Example 30 | Ir-O | 1-(2-ethylphosphonyl)-1-octadecylpiperidinium hydrogencarbonate | 1.91 |
| Example 31 | Sn-O | 1-(2-ethylphosphonyl)-1-octadecylpiperidinium hydrogencarbonate | 2.07 |
| Example 32 | In-O | 1-(2-ethylphosphonyl)-1-octadecylpiperidinium hydrogencarbonate | 1.79 |
| Example 33 | Ru-O | 1-(2-ethylphosphonyl)-1-octadecylpiperidinium hydrogencarbonate | 1.62 |
| Example 34 | Ru-In-O | 1-(2-ethylphosphonyl)-1-octadecylpiperidinium hydrogencarbonate | 1.55 |
| Example 35 | Co-Ni-Fe-O | 1-(2-ethylphosphonyl)-1-octadecylpiperidinium hydrogencarbonate | 1.59 |
| Comparative Example 1 | Ni-O | - | 1.71 |
| Comparative Example 2 | Co-O | - | 1.79 |
| Comparative Example 3 | Mn-O | - | 1.83 |
| Comparative Example 4 | Fe-O | - | 1.92 |
| Comparative Example 5 | Ir-O | - | 1.82 |
| Comparative Example 6 | Sn-O | - | 2.10 |
| Comparative Example 7 | In-O | - | 1.94 |
| Comparative Example 8 | Ru-O | - | 1.65 |
| Comparative Example 9 | Ru-In-O | | 1.58 |
| Comparative Example 10 | Co-Ni-Fe-O | | 1.62 |

F I G. 15

| | Oxidation catalyst | Modified organic molecule | Amine decomposition ratio in photoelectrochemical cell |
|---|---|---|---|
| Example 36 | Ru–O | 1-(2-ethylphosphonyl)-1-methylpyrrolidinium tetrafluoroborate | 0.15 |
| Example 37 | Ru–O | 1-ethyl-1-(2-ethylphosphonyl) pyrrolidinium tetrafluoroborate | 0.12 |
| Example 38 | Ru–O | 1-(2-ethylphosphonyl)-1-hexylpyrrolidinium tetrafluoroborate | 0.10 |
| Example 39 | Ru–O | 1-(2-ethylphosphonyl)-1-octylpyrrolidinium tetrafluoroborate | 0.08 |
| Example 40 | Ru–O | 1-dodecyl-1(2-ethylphosphonyl) pyrrolidinium tetrafluoroborate | 0.05 |
| Example 41 | Ru–O | 1-(2-ethylphosphonyl)-1-octadecylpyrrolidinium tetrafluoroborate | 0.03 |

F I G. 16

… … …

OXIDATION ELECTRODE AND PHOTOELECTROCHEMICAL DEVICE

CROSS REFERENCE TO RELATED APPLICATIONS

This application is a Continuation Application of PCT Application No. PCT/JP2014/079975, filed Nov. 12, 2014 and based upon and claims the benefit of priority from the prior Japanese Patent Application No. 2014-051795, filed Mar. 14, 2014, the entire contents of all of which are incorporated herein by reference.

FIELD

Embodiments described herein relate generally to an oxidation electrode and a photoelectrochemical device.

BACKGROUND

From the viewpoints of energy problems and environmental problems, efficient reduction of $CO_2$ using light energy, like plants, is demanded. Plants use a system referred to as the Z scheme, wherein light energy is excited in two steps. Based on the photochemical reaction of this system, plants oxidize water ($H_2O$ and $OH^-$) to obtain electrons, and reduce carbon dioxide ($CO_2$) to synthesize cellulose and saccharides.

However, the only techniques for artificially obtaining electrons from water to decompose $CO_2$ via a photochemical reaction without using a sacrificial reagent are highly inefficient. Efficient reduction decomposition of $CO_2$ requires efficient oxidation decomposition of water to obtain electrons.

BRIEF DESCRIPTION OF THE DRAWINGS

FIGS. 4A and 4B show the effect of the oxidation electrode according to an embodiment.

FIG. 7 is a cross section showing another example of the operation principle of the photoelectrochemical cell according to an embodiment.

FIG. 10 is a cross section showing the structure of Modification 1 of the photoelectrochemical device according to an embodiment.

FIG. 11 is a cross section showing the structure of Modification 2 of the photoelectrochemical device according to an embodiment.

FIG. 12 shows the evaluations of the oxidation performance (water decomposition) of the oxidation electrodes of Examples 1 to 9 according to embodiments and Comparative Example 1.

FIG. 13 shows the evaluations of the oxidation performance of the oxidation electrodes of Examples 10 to 16 according to embodiments and Comparative Example 2.

FIG. 14 shows the evaluations of the oxidation performance of the oxidation electrodes of Examples 17 to 25 according to embodiments and Comparative Example 3.

FIG. 15 shows the evaluations of the oxidation performance of the oxidation electrodes of Examples 26 to 35 according to embodiments and Comparative Examples 1 to 10.

FIG. 16 shows the evaluations of the oxidation performance of the oxidation electrodes of Examples 36 to 41 according to embodiments.

DETAILED DESCRIPTION

Figure 1:
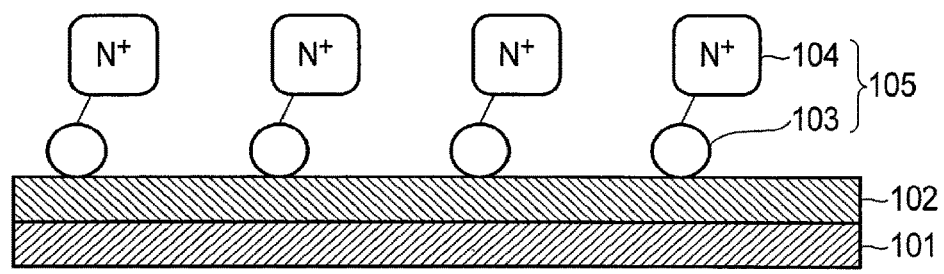
FIG. 1 shows the structure of the oxidation electrode according to an embodiment.

In general, according to one embodiment, an oxidation electrode includes: a collector; an oxidation catalyst formed on the collector; and a modified organic molecule which is bonded to the surface of the oxidation catalyst, and comprises a cationic functional group.

The present embodiment is explained below with reference to the drawings. In these drawings, the same components are indicated with the same reference numerals. In addition, duplicate explanations are made as necessary.

1. Oxidation Electrode

The oxidation electrode according to the present embodiment is explained using FIGS. 1, 2, 3 and 4. In the present embodiment, an oxidation catalyst 102 is stacked on the surface of a collector 101, and a modified organic molecule 105 containing a nitrogen cation 104 is formed on the surface of the oxidation catalyst 102. As a result of this, an oxidation reaction of water is highly efficiently achieved. The present embodiment is further described below in detail.

[Structure]

FIG. 1 shows the structure of the oxidation electrode according to an embodiment.

As shown in FIG. 1, the oxidation electrode according to the present embodiment is an electrode which electrochemically oxidizes water molecules, and includes a laminate provided with the collector 101, the oxidation catalyst 102, and the modified organic molecule 105.

The collector 101 is, for example, a metal substrate such as a stainless steel plate, but is not limited to the example as long as it has electric conductivity, and may be appropriately selected in consideration of cost, processability, and other factors. In addition, the collector 101 may be provided with a transparent conductive oxide such as ITO (indium tin oxide), zinc oxide (ZnO), FTO (fluorine-doped tin oxide), AZO (aluminum-doped zinc oxide), or ATO (antimony-doped tin oxide). Alternatively, the collector 101 may be provided with a laminate structure of a metal and a transparent conductive oxide, a composite structure of a metal and other conductive material, or a composite structure of a transparent conductive oxide and other conductive material.

The oxidation catalyst 102 is formed on the surface of the collector 101. The oxidation catalyst 102 is a part of the electrode which electrochemically oxidizes water molecules, and includes an oxide layer which decreases the activation energy for the oxidation reaction. In other words, it includes an oxide layer which decreases the overvoltage during the reaction for oxidizing water ($H_2O$ or $OH^-$) to draw out electrons. Examples of the material of the oxidation catalyst 102 include binary metal oxides such as manganese oxide (Mn—O), iron oxide (Fe—O), cobalt oxide (Co—O), nickel oxide (Ni—O), iridium oxide (Ir—O), tin oxide (Sn—O), indium oxide (In—O), and ruthenium oxide (Ru—O), ternary metal oxides such as Ni—Co—O, La—Co—O, Ni—La—O, and Sr—Fe—O, and quarternary metal oxides such as Pb—Ru—Ir—O and La—Sr—Co—O. The form of the oxidation catalyst 102 is not limited to a thin film, and may be a lattice, particles, or wire.

When the hydrogen ion concentration in the electrolytic solution is lower than 7 (pH<7), the oxidation catalyst 102 oxidizes $H_2O$ to form $O_2$ and $H^+$. On the other hand, when the hydrogen ion concentration in the electrolytic solution is higher than 7 (pH>7), it oxidizes $OH^-$ to form $O_2$ and $H_2O$.

The modified organic molecule 105 is a single layer film chemically bonded to the surface of the oxidation catalyst 102. The modified organic molecule 105 has the nitrogen cation 104, and a reactive functional group 103 bonded to the end at the oxidation catalyst 102 side (one end side).

The nitrogen cation 104 imparts an electrostatic charge and hydrophilicity (improvement of polarity) to the oxidation catalyst 102. As a result of this, the nitrogen cation 104 promotes an oxidation reaction by the oxidation catalyst 102. When the hydrogen ion concentration in the electrolytic solution is lower than 7 (pH<7), the nitrogen cation 104 attracts $H_2O$ necessary for the oxidation reaction by hydrophilicity to promote the oxidation reaction. On the other hand, when the hydrogen ion concentration in the electrolytic solution is higher than 7 (pH>7), it attracts $OH^-$ necessary for the oxidation reaction by the electrostatic force of attraction to promote the reaction.

In addition, the nitrogen cation 104 imparts an electrostatic charge and steric hindrance (physical hindrance) to the oxidation catalyst 102. Owing to the actions of the steric hindrance and electrostatic repulsion action, the nitrogen cation 104 inhibits contact of the amine or amine cation contained in the electrolytic solution with the oxidation catalyst 102. As a result of this, the oxidation reaction of amine or amine cation by the oxidation catalyst 102 is inhibited, and the oxidation reaction of $H_2O$ or $OH^-$ is promoted.

The nitrogen cation 104 is preferably a quaternary nitrogen cation such as ammonium cation, imidazole cation, pyridinium cation, piperidinium cation, or pyrrolidinium cation. Among them, an imidazole cation is more preferred, because it markedly improves stability and oxidation activity in oxidizing environments. However, the nitrogen cation 104 is not limited to these examples, and may be a primary or secondary nitrogen cation of amines.

The reactive functional group 103 is bonded to an end of the nitrogen cation 104 at the side of the oxidation catalyst 102. The reactive functional group 103 has affinity for the oxidation catalyst 102, and chemically reacts with and bonds to the oxidation catalyst 102. As a result of this, the modified organic molecule 105 is immobilized on the oxidation catalyst 102. In the reactive functional group 103, for example, at least one atom selected from carbon, silicon, and phosphorus is bonded to the oxidation catalyst 102 through an oxygen atom. More specifically, the reactive functional group 103 is a functional group which can form a covalent bond, such as a carboxylate group, a phosphonate group, a halogenated silyl group, or an alkoxysilyl group. Among them, a phosphonate group or alkoxysilyl group is preferred, and a phosphonate group is more preferred, because they have marked bonding strength.

Figure 2:
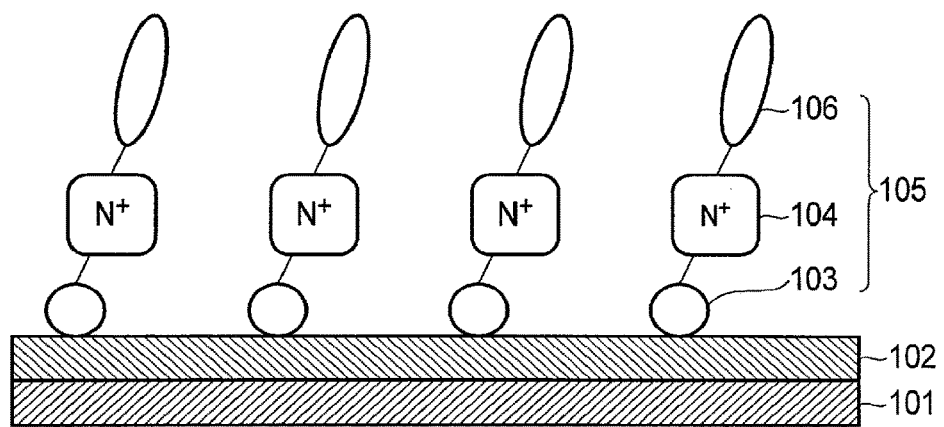
FIG. 2 shows the structure of Modification 1 of the oxidation electrode according to an embodiment.

FIG. 2 shows the structure of Modification 1 of the oxidation electrode according to the present embodiment.

As shown in FIG. 2, in the oxidation electrode in Modification 1, the modified organic molecule 105 further has an alkyl group 106.

The alkyl group 106 is bonded to the nitrogen cation 104 at the opposite side (the other side) to the oxidation catalyst 102. The alkyl group 106 imparts further steric hindrance to the oxidation catalyst 102. In other words, the alkyl group 106 promotes the steric hindrance effect by the nitrogen cation 104. As a result of this, the alkyl group 106 allows the nitrogen cation 104 to further inhibit contact of the amine or amine cation contained in the electrolytic solution with the oxidation catalyst 102. Accordingly, the oxidation catalyst 102 further inhibits an oxidation reaction of amine or amine cation, and further promotes an oxidation reaction of $H_2O$ or $OH^-$.

The longer the alkyl chain of the alkyl group 106, the more highly the alkyl group 106 inhibits the contact of amine or amine cation with the oxidation catalyst 102, and promotes oxidation reaction of $H_2O$ or $OH^-$. On the other hand, if the alkyl chain is too long, the supply (contact) of $H_2O$ or $OH^-$ to the oxidation catalyst 102 is inhibited by strong hydrophobicity. Accordingly, the alkyl chain length of the alkyl group 106 is preferably a carbon number of 1 to 20. The alkyl group 106 may be substituted, branched, or formed into a ring.

Figure 3:
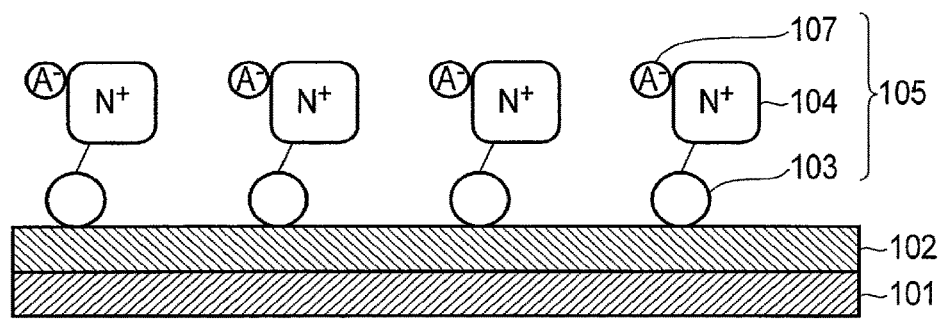
FIG. 3 shows the structure of Modification 2 of the oxidation electrode according to an embodiment.

FIG. 3 shows the structure of Modification 2 of the oxidation electrode according to the present embodiment.

As shown in FIG. 3, in the oxidation electrode of Modification 2, the modified organic molecule 105 further has a counter anion 107 to the nitrogen cation 104.

The counter anion 107 is bonded to the nitrogen cation 104, and has hydrophilicity. As a result of this, $H_2O$ or $OH^-$ is smoothly supplied to the oxidation catalyst 102. The counter anion 107 has electrochemical stability against oxidation. As the counter anion 107, at least one is selected from tetrafluoroborate anions, dicyanamide anions, hydrogen carbonate anions, nitrate anions, borate anions, sulfate anions, phosphate anions, perchlorate anions, and halogen anions. The counter anion 107 is appropriately selected in consideration of the type of the supporting electrolyte used in the electrolytic solution. The counter anion can be changed by ion exchange through immersion of the oxidation electrode in a solution containing the desired counter anion.

Examples of the organic molecule composing the modified organic molecule 105 include N-trimethoxysilylpropyl-N,N,N-trimethylammonium chloride, butyldimethyl(3-trimethoxysilylpropyl)ammonium tetrafluoroborate, dibutylmethyl(3-trimethoxysilylpropyl)ammonium dicyanamide, hexyldimethyl(3-trimethoxysilylpropyl)ammonium hydrogen carbonate, dodecyldimethyl(3-trimethoxysilylpropyl)ammonium sulfate, octadecyldimethyl(3-trimethoxysilylpropyl)ammonium perchlorate, 1-methyl-3-(2-triethoxysilylethyl)imidazolium tetrafluoroborate, 1-ethyl-3-(2-triethoxysilylethyl)imidazolium tetrafluoroborate, 1-butyl-3-(2-triethoxysilylethyl)imidazolium tetrafluoroborate, 1-hexyl-3-(2-triethoxysilylethyl)imidazolium tetrafluoroborate, 1-octyl-3-(2-triethoxysilylethyl)imidazolium tetrafluoroborate, 1-dodecyl-3-(2-triethoxysilylethyl)imidazolium tetrafluoroborate, 1-octadecyl-3-(2-triethoxysilylethyl)imidazolium tetrafluoroborate, 1,2-dimethyl-3-(2-triethoxysilylethyl)imidazolium tetrafluoroborate, 1-(2-ethylphosphonyl)-3-methylimidazolium tetrafluoroborate, 1-ethyl-3-(2-ethylphosphonyl)imidazolium tetrafluoroborate, 1-butyl-3-(2-ethylphosphonyl)imidazolium tetrafluoroborate, 1-(2-ethylphosphonyl)-3-hexylimidazolium tetrafluoroborate, 1-(2-ethylphosphonyl)-3-octylimidazolium tetrafluoroborate, 1-dodecyl-3-(2-ethylphosphonyl)imidazolium tetrafluoroborate, 1-(2-ethylphosphonyl)-3-octadecylimidazolium tetrafluoroborate, 1,2-dimethyl-3-(2-ethylphosphonyl)imidazolium tetrafluoroborate, 1-methyl-3-(2-triethoxysilylethyl)imidazolium chloride, 1-ethyl-3-(2-triethoxysilylethyl)imidazolium dicyanamide, 1-butyl-3-(2-triethoxysilylethyl)imidazolium hydrogen carbonate, 1-hexyl-3-(2-triethoxysilylethyl)imidazolium nitrate, 1-octyl-3-(2-triethoxysilylethyl)imidazolium sulfate, 1-dodecyl-3-(2-triethoxysilylethyl)imidazolium borate, 1-octadecyl-3-(2-triethoxysilylethyl)imidazolium phosphate, 1,2-dimethyl-3-(2-triethoxysilylethyl)imidazolium perchlorate, 1-(2-ethylphosphonyl)-3-methylimidazolium bromide, 1-ethyl-3-(2-ethylphosphonyl)imidazolium dicyanamide, 1-butyl-3-(2-ethylphosphonyl)imidazolium hydrogen carbonate, 1-(2-ethylphosphonyl)-3-hexylimidazolium nitrate, 1-(2-ethylphosphonyl)-3-octylimidazolium sulfate, 1-dodecyl-3-(2-ethylphosphonyl)imidazolium borate, 1-(2-ethylphosphonyl)-3-octadecylimidazolium phosphate, 1,2-dimethyl-3-(2-ethylphosphonyl)imidazolium perchlorate, 1-methyl-4-(2-triethoxysilylethyl)pyridinium tetrafluoroborate, 1-ethyl-4-(2-triethoxysilylethyl)pyridinium tetrafluoroborate, 1-hexyl-4-(2-triethoxysilylethyl)pyridinium tetrafluoroborate, 1-octyl-4-(2-triethoxysilylethyl)pyridinium tetrafluoroborate, 1-dodecyl-4-(2-triethoxysilylethyl)pyridinium tetrafluoroborate, 1-octadecyl-4-(2-triethoxysilylethyl)pyridinium tetrafluoroborate, 1-(2-ethylphosphonyl)-4-methylpyridinium tetrafluoroborate, 1-ethyl-4-(2-ethylphosphonyl)pyridinium tetrafluoroborate, 1-(2-ethylphosphonyl)-4-hexyl pyridinium tetrafluoroborate, 1-(2-ethylphosphonyl)-4-octyl pyridinium tetrafluoroborate, 1-dodecyl-4-(2-ethylphosphonyl)pyridinium tetrafluoroborate, 1-(2-ethylphosphonyl)-4-octadecyl pyridinium tetrafluoroborate, 1-methyl-4-(2-triethoxysilylethyl)pyridinium chloride, 1-ethyl-4-(2-triethoxysilylethyl)pyridinium dicyanamide, 1-hexyl-4-(2-triethoxysilylethyl)pyridinium hydrogen carbonate, 1-octyl-4-(2-triethoxysilylethyl)pyridinium nitrate, 1-dodecyl-4-(2-triethoxysilylethyl)pyridinium sulfate, 1-octadecyl-4-(2-triethoxysilylethyl)pyridinium borate, 1-methyl-4-(2-triethoxysilylethyl)pyridinium phosphate, 1-ethyl-4-(2-triethoxysilylethyl)pyridinium perchlorate, 1-(2-ethylphosphonyl)-4-methylpyridinium bromide, 1-ethyl-4-(2-ethylphosphonyl)pyridinium dicyanamide, 1-(2-ethylphosphonyl)-4-hexyl pyridinium hydrogen carbonate, 1-(2-ethylphosphonyl)-4-octyl pyridinium nitrate, 1-dodecyl-4-(2-ethylphosphonyl)pyridinium sulfate, 1-(2-ethylphosphonyl)-4-octadecylpyridinium borate, 1-(2-ethylphosphonyl)-4-methylpyridinium phosphate, 1-ethyl-4-(2-ethylphosphonyl)pyridinium perchlorate, 1-methyl-1-(2-triethoxysilylethyl)piperidinium tetrafluoroborate, 1-ethyl-1-(2-triethoxysilylethyl)piperidinium tetrafluoroborate, 1-hexyl-1-(2-triethoxysilylethyl)piperidinium tetrafluoroborate, 1-octyl-1-(2-triethoxysilylethyl)piperidinium tetrafluoroborate, 1-dodecyl-1-(2-triethoxysilylethyl)piperidinium tetrafluoroborate, 1-octadecyl-1-(2-triethoxysilylethyl)piperidinium tetrafluoroborate, 1-(2-ethylphosphonyl)-1-methylpiperidinium tetrafluoroborate, 1-ethyl-1-(2-ethylphosphonyl)piperidinium tetrafluoroborate, 1-(2-ethylphosphonyl)-1-hexyl piperidinium tetrafluoroborate, 1-(2-ethylphosphonyl)-1-octyl piperidinium tetrafluoroborate, 1-dodecyl-1-(2-ethylphosphonyl)piperidinium tetrafluoroborate, 1-(2-ethylphosphonyl)-1-octadecyl piperidinium tetrafluoroborate, 1-methyl-1-(2-triethoxysilylethyl)piperidinium chloride, 1-ethyl-1-(2-triethoxysilylethyl)piperidinium dicyanamide, 1-hexyl-1-(2-triethoxysilylethyl)piperidinium hydrogen carbonate, 1-octyl-1-(2-triethoxysilylethyl)piperidinium nitrate, 1-dodecyl-1-(2-triethoxysilylethyl)piperidinium sulfate, 1-(2-ethylphosphonyl)-1-octadecyl piperidinium borate, 1-(2-ethylphosphonyl)-1-methylpiperidinium phosphate, 1-ethyl-1-(2-ethylphosphonyl)piperidinium perchlorate, 1-(2-ethylphosphonyl)-1-methylpiperidinium chloride, 1-ethyl-1-(2-ethylphosphonyl)piperidinium dicyanamide, 1-(2-ethylphosphonyl)-1-hexyl piperidinium hydrogen carbonate, 1-(2-ethylphosphonyl)-1-octyl piperidinium nitrate, 1-dodecyl-1-(2-ethylphosphonyl)piperidinium sulfate, 1-(2-ethylphosphonyl)-1-octadecyl piperidinium borate, 1-(2-ethylphosphonyl)-1-methylpiperidinium phosphate, 1-ethyl-1-(2-ethylphosphonyl)piperidinium perchlorate, 1-methyl-1-(2-triethoxysilylethyl)pyrrolidinium tetrafluoroborate, 1-ethyl-1-(2-triethoxysilylethyl)pyrrolidinium tetrafluoroborate, 1-hexyl-1-(2-triethoxysilylethyl)pyrrolidinium tetrafluoroborate, 1-octyl-1-(2-triethoxysilylethyl)pyrrolidinium tetrafluoroborate, 1-dodecyl-1-(2-triethoxysilylethyl)pyrrolidinium tetrafluoroborate, 1-octadecyl-1-(2-triethoxysilylethyl)pyrrolidinium tetrafluoroborate, 1-(2-ethylphosphonyl)-1-methylpyrrolidinium tetrafluoroborate, 1-ethyl-1-(2-ethylphosphonyl)pyrrolidinium tetrafluoroborate, 1-(2-ethylphosphonyl)-1-hexyl pyrrolidinium tetrafluoroborate, 1-(2-ethylphosphonyl)-1-octyl pyrrolidinium tetrafluoroborate, 1-dodecyl-1-(2-ethylphosphonyl)pyrrolidinium tetrafluoroborate, 1-(2-ethylphosphonyl)-1-octadecyl pyrrolidinium tetrafluoroborate, 1-methyl-1-(2-triethoxysilylethyl)pyrrolidinium chloride, 1-ethyl-1-(2-triethoxysilylethyl)piperidiniumdicyanamide, 1-hexyl-1-(2-triethoxysilylethyl)pyrrolidinium hydrogen carbonate, 1-octyl-1-(2-triethoxysilylethyl)pyrrolidinium nitrate, 1-dodecyl-1-(2-triethoxysilylethyl)pyrrolidinium sulfate, 1-octadecyl-1-(2-triethoxysilylethyl)pyrrolidinium borate, 1-methyl-1-(2-triethoxysilylethyl)pyrrolidinium phosphate, 1-ethyl-1-(2-triethoxysilylethyl)pyrrolidinium perchlorate, 1-(2-ethylphosphonyl)-1-methylpyrrolidinium chloride, 1-ethyl-1-(2-ethylphosphonyl)pyrrolidinium dicyanamide, 1-(2-ethylphosphonyl)-1-hexyl pyrrolidinium hydrogen carbonate, 1-(2-ethylphosphonyl)-1-octyl pyrrolidinium nitrate, 1-dodecyl-1-(2-ethylphosphonyl)piperidinium sulfate, 1-(2-ethylphosphonyl)-1-octadecyl pyrrolidinium borate, 1-(2-ethylphosphonyl)-1-methylpyrrolidinium phosphate, and 1-ethyl-1-(2-ethylphosphonyl)pyrrolidinium perchlorate.

[Making Method]

The oxidation catalyst 102 is formed on the surface of the collector 101 by any known vacuum film formation method such as sputtering, vapor deposition, or ALD (atomic layer deposition), or any known wet film formation method such as electrodeposition or electroless plating. The form of the oxidation catalyst 102 is not limited to a thin film, and may be a lattice, particles, or wire.

The formation of the modified organic molecule 105 on the oxidation catalyst 102 may use any known method. For example, the oxidation catalyst 102 is brought into contact with a solution of the modified organic molecule 105 which has affinity for the oxidation catalyst 102, or the modified organic molecule 105 is sprayed to the oxidation catalyst 102 using a sprayer or the like.

In the method of contacting the oxidation catalyst 102 with the solution of the modified organic molecule 105, the hydroxyl group contained in the reactive functional group 103 of the modified organic molecule 105, or the hydroxyl group formed by way of hydrolysis reaction and the hydroxyl group on the surface of the oxidation catalyst 102 forms a new chemical bond by a dehydration condensation reaction. Furthermore, aggregation of the modified organic molecule 105 forms a self-assembled monolayer (SAM).

The solvent for dissolving the organic molecule is not limited as long as it dissolves the organic molecule.

Examples of the solvent for dissolving the organic molecule include alcohols such as ethanol, aromatics such as toluene, and aliphatic organic solvents such as hexane. The use of ethanol is preferred, from the viewpoints of solubility for the organic molecule and easiness of handling.

The pH of the solution of the modified organic molecule 105 is preferably adjusted so as to promote the bonding between the oxidation catalyst 102 and the hydroxyl group contained in the reactive functional group 103, or the hydroxyl group formed by way of a hydrolysis reaction.

For example, when the reactive functional group 103 is an alkoxysilyl group, a hydrolysis reaction is promoted by making the solution acidic or alkaline. As a result of this, more hydroxyl groups to be bonded to the oxidation catalyst 102 are formed.

On the other hand, in the reaction of dehydration condensation between the reactive functional group 103 and the oxidation catalyst 102, the dehydration condensation reaction is retarded by making the pH weakly acidic. As a result of this, the solution is stabilized because the dehydration condensation reaction between the modified organic molecules 105 is inhibited, and the reactive functional group 103 and the oxidation catalyst 102 are readily bonded together. The pH of the solution of the modified organic molecule 105 uses an organic acid such as acetic acid, formic acid, or lactic acid.

When the reactive functional group 103 is a phosphonate group or other group which is readily bonded to the oxidation catalyst 102, adjustment of the pH of the solution of the modified organic molecule 105 is unnecessary. In addition, the pH of the solution of the modified organic molecule 105 may be appropriately adjusted according to the reaction time, reaction amount, or reactivity of the modified organic molecule 105.

An example of the method for forming the modified organic molecule 105 on the oxidation catalyst 102 is described below in more detail.

A solution of the modified organic molecule 105 in ethanol is prepared, and the collector 101 having the oxidation catalyst 102 formed thereon is immersed in the solution for several minutes to several hours. As a result of this, the modified organic molecule 105 is formed on the surface of the oxidation catalyst 102. The concentration of the modified organic molecule 105, immersion time, and immersion temperature and other conditions may be appropriately changed according to the structure and other factors of the modified organic molecule 105, because they influence the formation condition of the monolayer.

For example, regarding the concentration, when the concentration of the modified organic molecule 105 is low, the formation of the monolayer takes time. On the other hand, when the concentration is high, excessive molecules can be adsorbed in layers to the monolayer. Therefore, the concentration of the modified organic molecule 105 is preferably 0.1 mM or more and 100 mM or less, and more preferably 1 mM or more and 10 mM or less. In addition, regarding the immersion time, the formation of a self-assembled monolayer requires a long time. Therefore, the immersion time is preferably 1 minute or more and 100 hours or less, and preferably 5 minutes or more and 48 hours or less. The immersion temperature influences the formation of a self-assembled monolayer. Therefore, the immersion temperature is preferably room temperature or higher and 60° C. or lower, in consideration of the vapor pressure and boiling point of the solvent.

The method for confirming the formation of the modified organic molecule 105 may use a known method.

For example, as the surface analysis method, the evaluation can be carried out using Fourier transform infrared spectroscopy (FT-IR) using the reflection method. As a result of this, the infrared spectrum of the thin film and molecular adsorption species on the surface of the oxidation catalyst 102 can be measured with high sensitivity. More specifically, the structure of the modified organic molecule 105, especially the information of the functional groups can be known. In addition, the use of X-ray photoelectron spectroscopy analysis (XPS) allows measurement of the chemical condition of the modified organic molecule 105, quantitative analysis of the elements, and composition of the anion. Accordingly, the abundance of the modified organic molecule 105 per unit area on the oxidation catalyst 102 can be known. In addition, the use of a contact angle meter allows evaluation of the presence or absence of the modified organic molecule 105 from the difference in water wettability.

Effect

In this embodiment, the oxidation catalyst 102 is stacked on the surface of the collector 101, and the modified organic molecule 105 containing the nitrogen cation 104 is formed on the surface of the oxidation catalyst 102. Subsequently, in the oxidation catalyst 102, a water oxidation reaction is carried out. As a result of this, the following effect is obtained.

FIGS. 4A and 4B show the effect of the oxidation electrode according to the present embodiment.

As shown in the figures, the nitrogen cation 104 imparts an electrostatic charge and hydrophilicity to the oxidation catalyst 102 to promote an oxidation reaction. More specifically, when the hydrogen ion concentration of the electrolytic solution is lower than 7 (pH<7), the nitrogen cation 104 attracts $H_2O$ necessary for the oxidation reaction by hydrophilicity, thereby promoting the oxidation reaction of $H_2O$ by the oxidation catalyst 102. On the other hand, when the hydrogen ion concentration of the electrolytic solution is higher than 7 (pH>7), the nitrogen cation 104 attracts $OH^-$ necessary for the oxidation reaction by the electrostatic force of attraction, thereby promoting the reaction of $OH^-$ by the oxidation catalyst 102.

In addition, as shown in Modification 2, as the modified organic molecule 105 further contains the counter anion 107 having hydrophilicity, the above-described effect is further promoted.

The electrolytic solution may contain an amine for the purpose of absorbing $CO_2$. The amine is readily electrochemically oxidized in comparison with $H_2O$ and $OH^-$. Therefore, it may decrease the $CO_2$ absorptivity of the electrolytic solution. In addition, the oxidation catalyst 102 deteriorates the efficiency of the oxidation reaction of $H_2O$ and $OH^-$, because the oxidation reaction of amines is easy to be caused than the oxidation reaction of $H_2O$ and $OH^-$.

On the other hand, in the present embodiment, the nitrogen cation 104 imparts an electrostatic charge and steric hindrance to the oxidation catalyst 102. As a result of this, the nitrogen cation 104 inhibits the contact of the amine or amine cation contained in the electrolytic solution with the oxidation catalyst 102. More specifically, the oxidation reaction of the amine or amine cation by the oxidation catalyst 102 is inhibited. Accordingly, even if an amine or amine cation is contained in the electrolytic solution, the oxidation reaction of $H_2O$ or $OH^-$ is preferentially promoted.

In addition, as shown in Modification 1, the above-described effect is further promoted by the further inclusion of the alkyl group 106 in the modified organic molecule 105.

2. Photoelectrochemical Cell

Using FIGS. 5 to 7, the photoelectrochemical cell using the oxidation electrode according to the present embodiment is described below.

Figure 5:
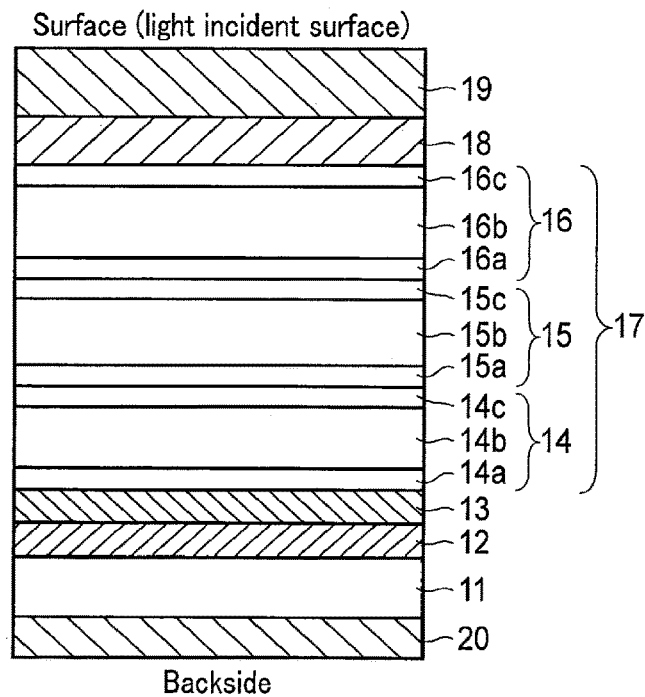
FIG. 5 is a cross section showing the structure of the photoelectrochemical cell according to an embodiment.

FIG. 5 is a cross section showing the structure of the photoelectrochemical cell according to the present embodiment.

As shown in FIG. 5, the photoelectrochemical cell according to the present embodiment includes a laminate provided with a substrate 11, a reflecting layer 12, a reduction electrode layer 13, a multijunction solar cell 17, an oxidation electrode layer 18, an oxidation catalyst layer 19, and a reduction catalyst layer 20.

As will be described below in detail, the above-described oxidation electrode is used as the oxidation electrode layer 18 and oxidation catalyst layer 19 in the photoelectrochemical cell.

On the front side of the substrate 11, the reflecting layer 12, reduction electrode layer 13, multijunction solar cell 17, oxidation electrode layer 18, and oxidation catalyst layer 19 are formed. On the other hand, on the backside of the substrate 11, the reduction catalyst layer 20 is formed.

The substrate 11 is provided for supporting the photoelectrochemical cell, and increasing its mechanical strength. The substrate 11 has electrical conductivity, and includes, for example, a metal sheet such as Au, Ag, Cu, Pt, Zn, Fe, Ti, Sn, In, Bi, or Ni, or an alloy plate including at least one of them, such as SUS. Alternatively, the substrate 11 may be provided with a conductive resin. Yet alternatively, the substrate 11 may be provided with a semiconductor substrate such as Si or Ge. As will be described later, the substrate 11 may be provided with an ion exchange membrane.

The reflecting layer 12 is formed on the surface of the substrate 11. The reflecting layer 12 includes a material reflecting light, and includes, for example, a distributed Bragg reflection layer made of a metal layer or a semiconductor multilayer. The reflecting layer 12 is formed between the substrate 11 and the multijunction solar cell 17, thereby reflecting the light which has not been absorbed in the multijunction solar cell 17, and allows it to enter into the multijunction solar cell 17 again. As a result of this, the light absorptance in the multijunction solar cell 17 is improved.

The reduction electrode layer 13 is formed on the reflecting layer 12. The reduction electrode layer 13 is formed on the surface of the n type semiconductor layer (the below-described n type amorphous silicon layer 14a) of the multijunction solar cell 17. Therefore, the reduction electrode layer 13 is preferably provided with a material which allows ohmic contact with an n type semiconductor layer. The reduction electrode layer 13 includes, for example, a metal such as Ag, Au, Al, or Cu, or an alloy containing at least one of them. Alternatively, the reduction electrode layer 13 includes a transparent conductive oxide such as ITO (indium tin oxide) or zinc oxide (ZnO), FTO (fluorine-doped tin oxide), AZO (aluminum-doped zinc oxide), or ATO (antimony-doped tin oxide). In addition, the reduction electrode layer 13 may be provided with, for example, a laminate structure of a metal and a transparent conductive oxide, a composite structure of a metal and other conductive material, or a composite structure of a transparent conductive oxide and other conductive material.

The multijunction solar cell 17 is formed on the reduction electrode layer 13, and includes a first solar cell 14, a second solar cell 15, and a third solar cell 16. The first solar cell 14, second solar cell 15, and third solar cell 16 are solar batteries each including a pin junction semiconductor, and have different optical absorption wavelengths. When they are stacked flat, the multijunction solar cell 17 can absorb solar light having a wide range of wavelengths, and thus can more efficiently utilize solar light energy. In addition, the solar batteries are connected in series, and thus can achieve a high open voltage.

More specifically, the first solar cell 14 includes, from the lower portion, an n type amorphous silicon (a-Si) layer 14a, an intrinsic amorphous silicon germanium (a-SiGe) layer 14b, and a p type crystallite silicon (μc-Si) layer 14c. The a-SiGe layer 14b is a layer absorbing light in the short wavelength region of about 400 nm. More specifically, the first solar cell 14 causes charge separation by light energy in the short wavelength region.

In addition, the second solar cell 15 includes, from the lower portion, an n type a-Si layer 15a, an intrinsic a-SiGe layer 15b, and a p type μc-Si layer 15c. The a-SiGe layer 15b is a layer absorbing light in the medium wavelength region of about 600 nm. More specifically, the second solar cell 15 causes charge separation by light energy in the medium wavelength region.

In addition, the third solar cell 16 includes, from the lower portion, an n type a-Si layer 16a, an intrinsic a-Si layer 16b, and a p type μc-Si layer 16c. The a-Si layer 16b is a layer absorbing light in the longer wavelength region of about 700 nm. More specifically, the third solar cell 16 causes charge separation by light energy in the longer wavelength region.

In this manner, the multifunction solar cell 17 causes charge separation by light in each wavelength region. More specifically, the holes and electrons are separated at the positive electrode side (front side) and negative electrode side (backside), respectively. As a result of this, the multifunction solar cell 17 generates electromotive force.

In the above-described explanation, the multijunction solar cell 17 having a laminated structure provided with three solar batteries is taken as an example, but the battery is not limited to this structure. The multijunction solar cell 17 may have a laminated structure provided with two or four or more solar batteries. Alternatively, a solar cell may be used in place of the multijunction solar cell 17. In addition, the solar cell using a pin-junction semiconductor is explained above, but the solar cell may use a pn-junction semiconductor. In the above example, the semiconductor layer includes Si and Ge, but the layer may be provided with, for example, a compound semiconductor system such as GaAs, GaInP, AlGaInP, CdTe, or CuInGaSe. Furthermore, various forms such as monocrystalline, polycrystalline, or amorphous form may be used.

The oxidation electrode layer 18 and oxidation catalyst layer 19 are formed in this order on the multijunction solar cell 17. The oxidation electrode layer 18 and oxidation catalyst layer 19 are formed on the positive electrode side of the multijunction solar cell 17. In the oxidation catalyst layer 19, when the hydrogen ion concentration of the electrolytic solution is lower than 7 (pH<7), $H_2O$ is oxidized to form $O_2$ and $H^+$. On the other hand, when the hydrogen ion concentration of the electrolytic solution is higher than 7 (pH>7), $OH^-$ is oxidized to form $O_2$ and $H_2O$. Therefore, the oxidation catalyst layer 19 includes a material which decreases the activation energy for oxidation reaction. In other words, it includes a material which decreases the overvoltage during the reaction for oxidizing $H_2O$ or $OH^-$ to draw out electrons.

As the oxidation electrode layer 18 and oxidation catalyst layer 19, the above-described oxidation electrode is used.

More specifically, the oxidation electrode layer 18 corresponds to the collector 101, and the oxidation catalyst layer 19 corresponds to the oxidation catalyst 102 and modified organic molecule 105.

In addition, in the present example, the irradiated light passes through the oxidation electrode layer 18 and the oxidation catalyst layer 19 to reach the multijunction solar cell 17. Therefore, the oxidation electrode layer 18 and the oxidation catalyst layer 19 located on the side irradiated with light have optical transparency to irradiated light. More specifically, transparency of the oxidation electrode layer 18 and the oxidation catalyst layer 19 on the irradiated surface is at least 10% or more, more preferably 30% or more of the dose of irradiated light.

The reduction catalyst layer 20 is formed on the negative electrode side of the multijunction solar cell 17, and reduces $CO_2$ to form a carbon compound (for example, carbon monoxide, formic acid, formaldehyde, methane, methanol, or ethanol). Therefore, the reduction catalyst layer 20 includes a material which decreases the activation energy for reducing $CO_2$.

The reduction catalyst layer 20 is a metal containing at least one element selected from Au, Ag, Cu, Pt, Zn, Fe, Ti, Sn, In, Bi, and Ni. Among them, Au or Ag having high catalytic activity is preferred.

In addition, a protective layer may be placed on the surface of the multijunction solar cell 17, or between the electrode layer and catalyst layer on the side irradiated with light (in the present example, between the oxidation electrode layer 18 and the oxidation catalyst layer 19). The protective layer has electrical conductivity, and prevents corrosion of the multijunction solar cell 17 in the oxidation-reduction reaction. As a result of this, the life of the multijunction solar cell 17 is extended. In addition, the protective layer has optical transparency as necessary. Examples of the protective layer include dielectric thin films such as $TiO_2$, $ZrO_2$, $Al_2O_3$, $SiO_2$, or $HfO_2$. The film thickness is preferably 10 nm or less, and more preferably 5 nm or less, thereby achieving electrical conductivity by the tunnel effect.

Figure 6:
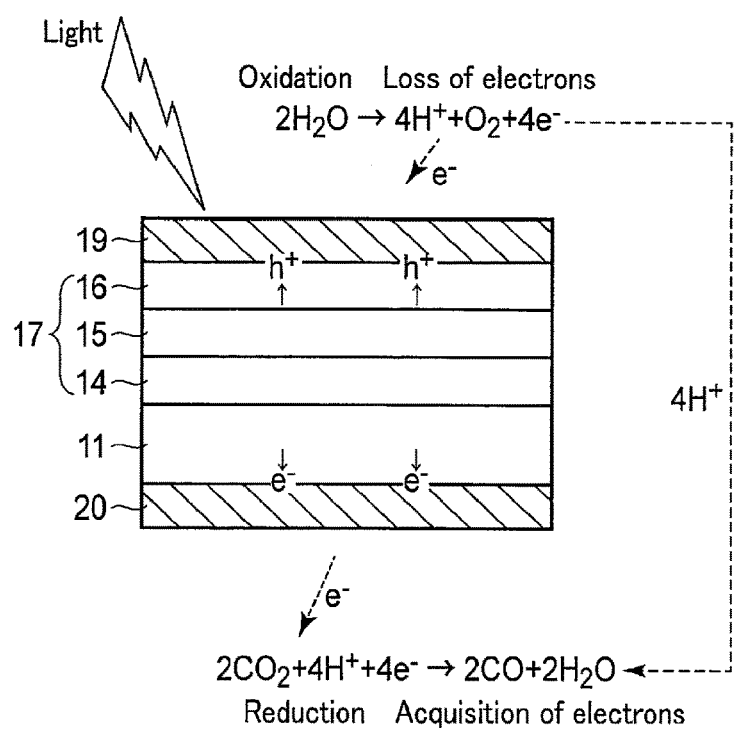
FIG. 6 is a cross section showing an example of the operation principle of the photoelectrochemical cell according to an embodiment.

FIG. 6 is a cross section showing an example of the operation principle of the photoelectrochemical cell according to the present embodiment. FIG. 7 is a cross section showing another example of the operation principle of the photoelectrochemical cell according to the present embodiment. In these figures, the reflecting layer 12, the reduction electrode layer 13, and the oxidation electrode layer 18 are not shown.

As shown in FIGS. 6 and 7, when light enters from the surface side, the incident light passes through the oxidation catalyst layer 19 and the oxidation electrode layer 18, and reaches the multijunction solar cell 17. When the multijunction solar cell 17 absorbs light, it forms photoexcited electrons and holes coupling with them, and separates them. More specifically, charge separation occurs in each solar cell (the first solar cell 14, second solar cell 15, and third solar cell 16), wherein the photoexcited electrons move toward the n type semiconductor layer side (the reduction catalyst layer 20 side), and the holes coupling with the photoexcited electrons move toward the p type semiconductor layer side (the oxidation catalyst layer 19 side). As a result of this, electromotive force is generated in the multijunction solar cell 17.

In this manner, the photoexcited electrons generated in the multijunction solar cell 17 are used for the reduction reaction in the reduction catalyst layer 20 as a negative electrode, and the holes are used for the oxidation reaction in the oxidation catalyst layer 19 as a positive electrode. As a result of this, as shown in FIG. 6, the formula (1) occurs in the vicinity of the oxidation catalyst layer 19, the reaction of the formula (2) occurs in the vicinity of the reduction catalyst layer 20. The formulae (1) and (2) show the reaction when the electrolytic solution is an acidic solution having a hydrogen ion concentration of lower than 7.

$$2H_2O \rightarrow 4H^+ + O_2 + 4e^- \quad (1)$$

$$2CO_2 + 4H^+ + 4e^- \rightarrow 2CO + 2H_2O \quad (2)$$

As shown in the formula (1), in the vicinity of the oxidation catalyst layer 19, $H_2O$ is oxidized to form $O_2$, $H^+$, and electrons. Then, the $H^+$ formed at the oxidation catalyst layer 19 side moves toward the reduction catalyst layer 20 side through the below-described ion migration channel.

As shown in the formula (2), in the vicinity of the reduction catalyst layer 20, $CO_2$ is reduced by $H^+$ and electrons, and carbon monoxide (CO) and $H_2O$ are formed.

On the other hand, as shown in FIG. 7, when the electrolytic solution is a basic solution having a hydrogen ion concentration of higher than 7, the reaction of the formula (3) occurs in the vicinity of the oxidation catalyst layer 19, and the reaction of the formula (4) occurs in the vicinity of the reduction catalyst layer 20.

$$4OH^- \rightarrow O_2 + 2H_2O + 4e^- \quad (3)$$

$$2CO_2 + 2H_2O + 4e^- \rightarrow 2CO + 4OH^- \quad (4)$$

As shown in the formula (4), in the vicinity of the reduction catalyst layer 20, $CO_2$ causes a reduction reaction with $H_2O$ to receive electrons, and forms carbon monoxide (CO) and $OH^-$. Subsequently, the $OH^-$ formed at the reduction catalyst layer 20 side moves toward the oxidation catalyst layer 19 side through the below-described ion migration channel.

As shown in the formula (3), in the vicinity of the oxidation catalyst layer 19, $OH^-$ is oxidized to form $O_2$, $H_2O$, and electrons.

At this time, the multijunction solar cell 17 must have an open voltage not lower than the potential difference between the standard oxidation-reduction potential of the oxidation reaction occurring in the oxidation catalyst layer 19 and the standard oxidation-reduction potential of the reduction reaction occurring in the reduction catalyst layer 20. For example, when the hydrogen ion concentration (pH) of the reaction solution is 0, the standard oxidation-reduction potential of the oxidation reaction in the formula (1) is +1.23 [V], and the standard oxidation-reduction potential of the reduction reaction in the formula (2) is −0.1 [V]. Therefore, the open voltage of the multijunction solar cell 17 must be 1.33 [V] or more. More preferably, the open voltage must be not lower than the potential difference including any overvoltage. More specifically, for example, when each of the overvoltage in the oxidation reaction in the formula (1) and the reduction reaction in the formula (2) is 0.2 [V], the open voltage is preferably 1.73 [V] or more.

Not only the reduction reaction from $CO_2$ to CO shown in the formulae (2) and (4), but also the reduction reaction from $CO_2$ to HCOOH, HCHO, $CH_4$, $CH_3OH$, or $C_2H_5OH$ is a reaction consuming $H^+$ or forming $OH^-$. Therefore, when the $H^+$ formed in the oxidation catalyst layer 19 cannot move to the reduction catalyst layer 20 at the other end, or the $OH^-$ formed in the reduction catalyst layer 20 cannot move to the oxidation catalyst layer 19 at the other end, the efficiency of the entire reaction decreases. On the other hand, in the photoelectrochemical device according to the present embodiment, an ion migration channel for moving $H^+$ or $OH^-$ is formed, thereby improving the transportation of $H^+$ or $OH^-$ to achieve high photoreaction efficiency.

3. Photoelectrochemical Device

The photoelectrochemical device using the photoelectrochemical cell according to the present embodiment is described below using FIGS. 8 to 11.

Figure 8:
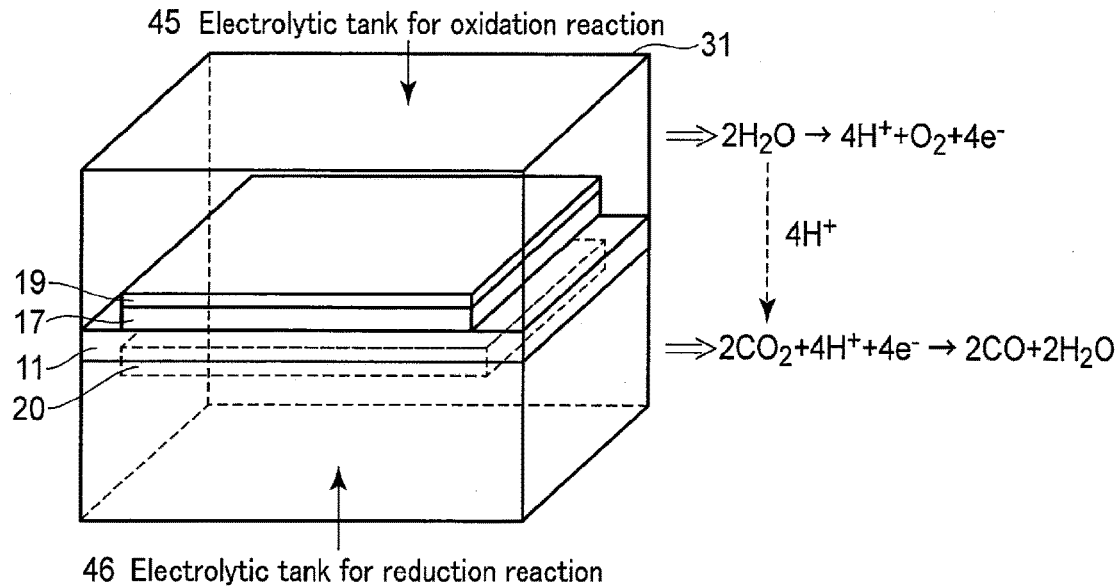
FIG. 8 is a perspective view showing the structure of the photoelectrochemical device according to an embodiment.
Figure 9:
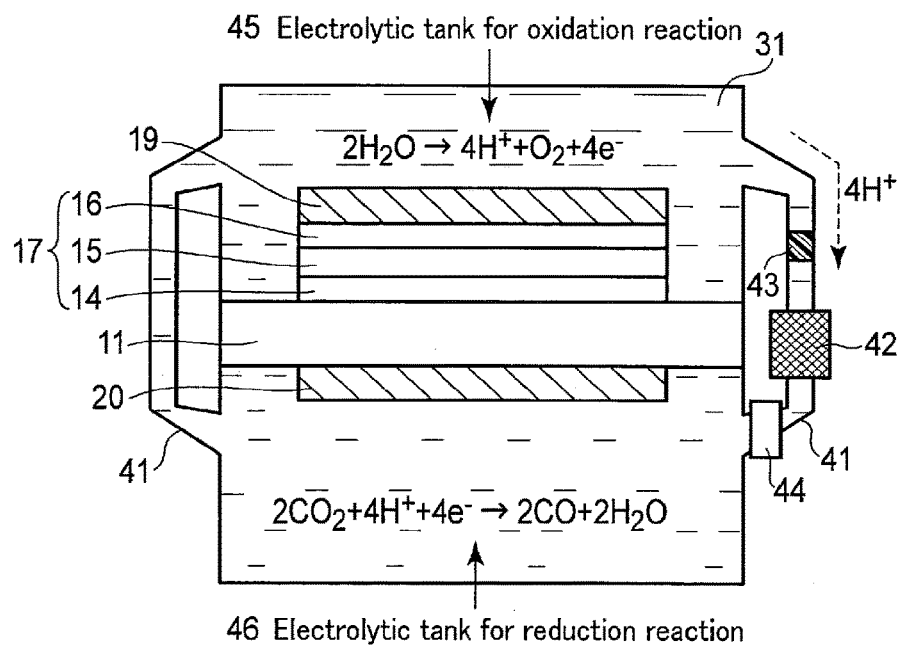
FIG. 9 is a cross section showing the structure of the photoelectrochemical device according to an embodiment.

FIG. 8 is a perspective view showing the structure of the photoelectrochemical device according to the present embodiment. FIG. 9 is a cross section showing the photoelectrochemical device according to the present embodiment. In FIG. 8, the below-described ion migration channel is not shown. The example herein is the oxidation-reduction reaction (the formulae (1) and (2)) when the electrolytic solution is an acidic solution having a hydrogen ion concentration of lower than 7. When the electrolytic solution is a basic solution having a hydrogen ion concentration of higher than 7, an oxidation-reduction reaction represented by the formulae (3) and (4) occurs.

The photoelectrochemical device according to the present embodiment includes a photoelectrochemical cell made of a laminate provided with an oxidation catalyst layer 19, a reduction catalyst layer 20, and a multijunction solar cell 17 formed between them, and an ion migration channel moving ions between the oxidation catalyst layer 19 and the reduction catalyst layer 20. As a result of this, the $H^+$ formed at the oxidation catalyst layer 19 side is moved to the reduction catalyst layer 20 with high photoreaction efficiency, and the $H^+$ decomposes carbon dioxide at the reduction catalyst layer 20 side.

As shown in FIGS. 8 and 9, the photoelectrochemical device according to the present embodiment includes a photoelectrochemical cell, an electrolytic bath 31 containing the photoelectrochemical cell therein, and an electrolytic bath channel 41 as an ion migration channel connected to the electrolytic bath 31.

The photoelectrochemical cell is formed into a plane, and separates the electrolytic bath 31 into two parts by at least the substrate 11. More specifically, the electrolytic bath 31 includes an electrolytic bath for oxidation reaction 45 wherein the oxidation catalyst layer 19 of the photoelectrochemical cell is located, and an electrolytic bath for reduction reaction 46 wherein the reduction catalyst layer 20 of the photoelectrochemical cell is located. Different electrolytic solutions may be fed into these electrolytic baths for oxidation reaction 45 and electrolytic bath for reduction reaction 46.

The electrolytic bath for oxidation reaction 45 is filled with an electrolytic solution such as a liquid containing $H_2O$. The oxidation catalyst layer 19 is immersed in this electrolytic solution. The electrolytic solution may contain any electrolyte, which preferably promotes an oxidation reaction of $H_2O$. In the electrolytic bath for oxidation reaction 45, the oxidation catalyst layer 19 oxidizes $H_2O$ to form $O_2$ and $H^+$. As the oxidation catalyst layer 19, the above-described oxidation catalyst is used. More specifically, the modified organic molecule 105 is formed on the oxidation catalyst 102 formed on the surface of the collector 101. In the oxidation catalyst 102, a water decomposition reaction is carried out.

The electrolytic bath for reduction reaction 46 is filled with an electrolytic solution such as a liquid containing $CO_2$. The reduction catalyst layer 20 is immersed in the electrolytic solution. In the electrolytic bath for reduction reaction 46, $CO_2$ is reduced by the reduction catalyst layer 20 to form a carbon compound. Specifically, $CO_2$ is converted to carbon monoxide (CO), formic acid (HCOOH), formaldehyde (HCHO), and methanol ($CH_3OH$). In addition, as a side reaction, moisture ($H_2O$) can be reduced to form hydrogen ($H_2$).

The electrolytic solution in the electrolytic bath for reduction reaction 46 preferably decreases the reduction potential of $CO_2$, has high ionic conductivity, and includes a $CO_2$ absorbent for absorbing $CO_2$. Examples of the electrolytic solution include an ion liquid or its aqueous solution provided with a salt of a cation such as an imidazolium ion or pyridinium ion, and an anion such as a tetrafluoroborate anion or hexafluoro phosphate, the liquid being in a liquid state in a wide temperature range. Other examples of the electrolytic solution include amine solutions such as ethanolamine, imidazole, or pyridine, and their aqueous solutions. The amine may be a primary, secondary, or tertiary amine. Examples of the primary amine include methylamine, ethylamine, propylamine, butylamine, pentylamine, and hexylamine. The hydrocarbon of the amine may be substituted with an alcohol or halogen. Examples of the amine substituted at a hydrocarbon include methanolamine ethanolamine, and chloromethylamine. It may contain an unsaturated bond. These hydrocarbons are the same for the secondary and tertiary amines. Examples of the secondary amine include dimethylamine, diethylamine, dipropylamine, dibutylamine, dipentylamine, dihexylamine, dimethanolamine, diethanolamine, and dipropanolamine. The substituted hydrocarbon may be the same or different. The same applies to the tertiary amine. Examples of those having different hydrocarbons include methylethylamine and methylpropylamine. Examples of the tertiary amine include trimethylamine, triethylamine, tripropylamine, tributylamine, trihexylamine, trimethanolamine, triethanolamine, tripropanolamine, tributanolamine, tripropanolamine, trihexanolamine, methyldiethylamine, and methyldipropylamine. Examples of the ion liquid cation include 1-ethyl-3-methylimidazolium ion, 1-methyl-3-propylimidazolium ion, 1-butyl-3-methylimidazole ion, 1-methyl-3-pentylimidazolium ion, and 1-hexyl-3-methylimidazolium ion. The 2-position of the imidazolium ion may be substituted. Examples include 1-ethyl-2,3-dimethylimidazolium ion, 1,2-dimethyl-3-propylimidazolium ion, 1-butyl 2,3-dimethylimidazolium ion, 1,2-dimethyl-3-pentylimidazolium ion, and 1-hexyl-2,3-dimethylimidazolium ion. Examples of the pyridinium ion include methylpyridinium, ethyl pyridinium, propyl pyridinium, butyl pyridinium, pentyl pyridinium, and hexyl pyridinium. The imidazolium ion and pyridinium ion may be substituted at their alkyl groups, and may contain unsaturated bonds. Examples of the anion include fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. Alternatively, twitter ions wherein the cation and anion in the ion liquid are bonded by a hydrocarbon are also useful.

The temperature of the electrolytic solutions filling the electrolytic bath for oxidation reaction 45 and electrolytic bath for reduction reaction 46 may be the same or different according to the use environment. For example, when the electrolytic solution used in the electrolytic bath for reduction reaction 46 is a $CO_2$-containing amine absorption liquid discharged from a plant, the temperature of the electrolytic solution is higher than the air temperature. In this case, the temperature of the electrolytic solution is 30° C. or higher and 150° C. or lower, more preferably 40° C. or higher and 120° C. or lower.

The electrolytic bath channel 41 is provided, for example, at a side of the electrolytic bath 31. One end of the electrolytic bath channel 41 is connected to the electrolytic bath for oxidation reaction 45, and the other is connected to the electrolytic bath for reduction reaction 46. More specifically, the electrolytic bath channel 41 connects the electrolytic bath for oxidation reaction 45 and the electrolytic bath for reduction reaction 46.

The electrolytic bath channel 41 is partly filled with an ion exchange membrane 43, and the ion exchange membrane 43 passes only specific ions. As a result of this, only specific ions are moved through the electrolytic bath channel 41 having the ion exchange membrane 43, while the electrolytic solution is separated between the electrolytic bath for oxidation reaction 45 and electrolytic bath for reduction reaction 46. More specifically, the photoelectrochemical device has a diaphragm structure which selectively passes through substances. The ion exchange membrane 43 is a proton exchange membrane, and moves the $H^+$ formed in the electrolytic bath for oxidation reaction 45 toward the electrolytic bath for reduction reaction 46 side. More specifically, examples of the ion exchange membrane 43 include cation exchange membranes such as NAFION or FLEMION, and anion exchange membranes such as NEOSEPTA or SELEMION.

Alternatively, the ion exchange membrane 43 may be replaced with, for example, agar such as a salt bridge which can shift ions, and separate the electrolytic solution. Commonly, performance of ion migration is good when a proton exchangeable solid polymer membrane such as NAFION is used.

In addition, a circulation mechanism 42 such as a pump may be provided in the electrolytic bath channel 41. As a result of this, circulation of the ion ($H^+$) is improved between the electrolytic bath for oxidation reaction 45 and the electrolytic bath for reduction reaction 46. In addition, two electrolytic bath channels 41 may be provided, and using the circulation mechanism 42 provided in at least one of them, ions are moved from the electrolytic bath for oxidation reaction 45 to the electrolytic bath for reduction reaction 46 through one of the electrolytic bath channels 41, and from the electrolytic bath for reduction reaction 46 to the electrolytic bath for oxidation reaction 45 through the other electrolytic bath channel 41. In addition, a plurality of circulation mechanisms 42 may be provided. Furthermore, a plurality (three or more) of the electrolytic bath channels 41 may be provided, thereby decreasing the ion diffusion, and more efficiently circulating the ions. In addition, the liquid may be transported, thereby inhibiting residence of gas bubbles on the surfaces of the electrodes and electrolysis layer, and reducing the efficiency decrease and light quantity distribution due to dispersion of solar light caused by bubbles.

In addition, the efficiently of ion circulation may be improved by making a temperature difference in the electrolytic solution using the heat increased by irradiation of the surface of the multijunction solar cell 17 with light, thereby reducing ion diffusion. In other words, ion migration is promoted by convection other than ion diffusion.

On the other hand, the solar cell performance and catalyst performance can be controlled by temperature control using a temperature control mechanism 44 for adjusting the temperature of the electrolytic solution provided in the electrolytic bath channel 41 or electrolytic bath 31. As a result of this, for example, the temperature of the reaction system can be uniformed for, for example, stabilizing and improving the performance of the solar cell and catalyst. In addition, a temperature rise can be prevented for stabilizing the system. The temperature control can change the selectivity of the solar cell and catalyst, thereby controlling the product.

In addition, in the present example, the end of the substrate 11 protrudes from the ends of the multi-junction solar cell 17, oxidation catalyst layer 19, and reduction catalyst layer 20, but this example is not exclusive. The substrate 11, multi-junction solar cell 17, oxidation catalyst layer 19, and reduction catalyst layer 20 may be planes having equal areas.

In the next place, modifications of the photoelectrochemical device according to the present embodiment are described below.

FIGS. 10 and 11 are cross sections showing the structures of Modifications 1 and 2 of the photoelectrochemical device according to the present embodiment. In the modifications of the photoelectrochemical device according to the present embodiment, the major points different from the above-described structure are explained below.

As shown in FIG. 10, Modification 1 of the photoelectrochemical device according to the present embodiment includes a photoelectrochemical cell, an electrolytic bath 31 containing the photoelectrochemical cell therein, and an opening 51 as an ion migration channel formed in a substrate 11.

The opening 51 is provided, for example, so as to penetrate the end of the substrate 11 from the electrolytic bath for oxidation reaction 45 side toward the electrolytic bath for reduction reaction 46 side. As a result of this, the opening 51 connects the electrolytic bath for oxidation reaction 45 and the electrolytic bath for reduction reaction 46.

The opening 51 is filled with an ion exchange membrane 43, the ion exchange membrane 43 passes only specific ions. As a result of this, only specific ions are moved through the opening 51 having the ion exchange membrane 43, while the electrolytic solution is separated between the electrolytic bath for oxidation reaction 45 and electrolytic bath for reduction reaction 46.

As shown in FIG. 11, Modification 2 of the photoelectrochemical device according to the present embodiment includes a photoelectrochemical cell, an electrolytic bath 31 containing the photoelectrochemical cell therein, a multi-junction solar cell 17, an oxidation catalyst layer 19, a reduction catalyst layer 20, and an opening 51 as an ion migration channel formed in a substrate 11.

The opening 51 is provided, for example, so as to penetrate the substrate 11, multijunction solar cell 17, oxidation catalyst layer 19, and reduction catalyst layer 20 from the electrolytic bath for oxidation reaction 45 side toward the electrolytic bath for reduction reaction 46 side. As a result of this, the opening 51 connects the electrolytic bath for oxidation reaction 45 and the electrolytic bath for reduction reaction 46.

The opening 51 is partly filled with the ion exchange membrane 43, and the ion exchange membrane 43 passes only specific ions. As a result of this, only specific ions are moved through the opening 51 having the ion exchange membrane 43, while the electrolytic solution is separated between the electrolytic bath for oxidation reaction 45 and electrolytic bath for reduction reaction 46.

In FIG. 11, the ion exchange membrane 43 is formed in a part of the opening 51. Alternatively, the ion exchange membrane 43 may be formed so as to fill the opening 51.

4. Example of Oxidation Electrode

Using FIGS. 12 to 16, examples of the oxidation electrode according to the present embodiment are described below.

FIG. 12 shows the evaluations of the oxidation performance (water decomposition) of the oxidation electrodes of Examples 1 to 9 according to embodiments and Comparative Example 1. FIG. 13 shows the evaluations of the oxidation performance of the oxidation electrodes of Examples 10 to 16 according to the present embodiments and Comparative Example 2. FIG. 14 shows the evaluations of the oxidation performance of the oxidation electrodes of Examples 17 to 25 according to the present embodiments and Comparative Example 3. FIG. 15 shows the evaluations of the oxidation performance of the oxidation electrodes of Examples 26 to 35 according to embodiments and Comparative Examples 1 to 10.

FIG. 16 shows the evaluations of the oxidation performance of the oxidation electrodes of Examples 36 to 41 according to the embodiments.

In the following examples, explanations of similar points are omitted, and different points are mainly explained.

Firstly, using FIG. 12, Examples 1 to 9 and Comparative Example 1 are described.

EXAMPLE 1

In the oxidation electrode of Example 1, the oxidation catalyst 102 is nickel oxide (Ni—O), and the modified organic molecule 105 is N-trimethoxysilylpropyl-N,N,N-trimethylammonium tetrafluoroborate.

(Making of Oxidation Electrode)

Firstly, a collector 101 provided with an FTO substrate (150 mm×250 mm, thickness 0.5 mm) is immersed in a nickel chloride aqueous solution at 95° C. containing dissolved urea, and kept therein for 1 hour. As a result of this, a precursor of the oxidation catalyst deposited from the aqueous solution is formed on the collector 101. Secondly, the collector 101 is burned in air at 350° C. for 1 hour, whereby an oxidation catalyst 102 is formed on the surface of the collector 101. The formation of the oxidation catalyst 102 can be confirmed by observation using an electron microscope. As a result of the observation, the oxidation catalyst 102 has a uniform film thickness in the surface direction, and the film thickness is 100 nm.

Subsequently, the modified organic molecule 105 is bonded to the surface of the oxidation catalyst 102. A solution of N-trimethoxysilylpropyl-N,N,N-trimethylammonium tetrafluoroborate as the modified organic molecule 105 is provided. This solution is an aqueous ethanol solution having a concentration of 10 mM (containing 10 wt % water), and hydrochloric acid is added to adjust the pH to 3 to 4. In this solution, a hydrolysis reaction is carried out for 6 hours. The oxidation catalyst 102 is immersed in the solution thus obtained for 30 minutes, whereby the modified organic molecule 105 is bonded to the oxidation catalyst 102. Thereafter, the oxidation catalyst 102 is taken out from the solution of the modified organic molecule 105, washed with ethanol, and dried in a nitrogen stream, thereby forming an oxidation electrode.

The bonding between the oxidation catalyst 102 and the modified organic molecule 105 can be confirmed using X-ray photoelectron spectroscopy (XPS), Fourier transform infrared spectroscopy (FT-IR) using the reflection method, or a contact angle meter. For example, in X-ray photoelectron spectroscopy (XPS), bonding of the modified organic molecule 105 can be confirmed by confirming the increase of the concentrations of the elements such as carbon, nitrogen, oxygen, or silicon contained in the reactive functional group by elemental analysis on the surface before and after bonding of the modified organic molecule 105. In addition, in Fourier transform infrared spectroscopy (FT-IR), the structure of the modified organic molecule 105, specifically the information of the functional group can be obtained, whereby the presence of the molecule can be directly confirmed. In addition, the contact angle meter can evaluate the presence or absence of the modified organic molecule 105 from the difference in water wettability.

(Measurement of Water Decomposition Performance)

The water decomposition performance of the oxidation electrode of Example 1 was evaluated as follows by photoelectrochemical measurement.

The evaluation of the oxidation electrode was carried out using an H type cell partitioned by an anion exchange membrane (SELEMION DSV, manufactured by Asahi Glass Co., Ltd.). At this time, a three-pole cell provided with an oxidation electrode as a working electrode, an Ag/AgCl electrode as a reference electrode, and a Pt electrode as a counter electrode was constructed. In addition, a 0.5 M potassium hydroxide aqueous solution (pH=13) was selected as an electrolytic solution.

The water decomposition performance of the oxidation electrode was evaluated using a photoelectrochemical measurement device (Solartron Cell Test System, manufactured by TOYO Corporation).

In this photoelectrochemical measurement device, the electrode potential (voltage) of the working electrode to the reference electrode was measured when constant-current electrolysis was carried out so as to make the electric current passing through the working electrode and counter electrode 1 mA/cm$^2$. Because the potential changes immediately after starting electrolysis, the value 30 minutes after stabilization of the voltage was used. In addition, in order to confirm that the electric current passing through the working electrode was generated by water decomposition, the oxygen (oxygen dissolved in the electrolytic solution) formed during electrolysis was measured by an oxygen analyzer (MicroxTX3-trace). With the progress of the electrolysis reaction, the oxygen concentration in the electrolytic solution increased, whereby the occurrence of oxygen formation by water decomposition at the working electrode was confirmed.

EXAMPLE 2

In the oxidation electrode of Example 2, the oxidation catalyst 102 was Ni—O and the modified organic molecule 105 was 1-methyl-3-(2-triethoxysilylethyl)imidazolium tetrafluoroborate. More specifically, in the oxidation electrode of Example 1, the modified organic molecule 105 (in particular, the nitrogen cation 104) was changed. In the same manner as in Example 1, the water decomposition performance of the oxidation electrode of Example 2 was evaluated by photoelectrochemical measurement.

EXAMPLE 3

In the oxidation electrode of Example 3, the oxidation catalyst 102 was Ni—O, and the modified organic molecule 105 was 1-methyl-4-(2-triethoxysilylethyl)pyridinium tetrafluoroborate. More specifically, in the oxidation electrode of Example 1, the modified organic molecule 105 (in particular, the nitrogen cation 104) was changed. In the same manner as in Example 1, the water decomposition performance of the oxidation electrode of Example 3 was evaluated by photoelectrochemical measurement.

EXAMPLE 4

In the oxidation electrode of Example 4, the oxidation catalyst 102 was Ni—O, and the modified organic molecule 105 was 1-methyl-1-(2-triethoxysilylethyl)piperidinium tetrafluoroborate. More specifically, in the oxidation electrode of Example 1, the modified organic molecule 105 (in particular, the nitrogen cation 104) was changed. In the same manner as in Example 1, the water decomposition performance of the oxidation electrode of Example 4 was evaluated by photoelectrochemical measurement.

EXAMPLE 5

In the oxidation electrode of Example 5, the oxidation catalyst 102 was Ni—O, and the modified organic molecule 105 was 1-methyl-1-(2-triethoxysilylethyl)pyrrolidinium tetrafluoroborate. More specifically, in the oxidation electrode of Example 1, the modified organic molecule 105 (in particular, the nitrogen cation 104) was changed. In the same manner as in Example 1, the water decomposition performance of the oxidation electrode of Example 5 was evaluated by photoelectrochemical measurement.

EXAMPLE 6

In the oxidation electrode of Example 6, the oxidation catalyst 102 was Ni—O, and the modified organic molecule 105 was 1-hexyl-3-(2-triethoxysilylethyl)imidazolium tetrafluoroborate. More specifically, in the oxidation electrode of Example 1, the modified organic molecule 105 (in particular, the nitrogen cation 104 and alkyl group 106) were changed. In addition, the alkyl group 106 was changed from that in Example 2. In the same manner as in Example 1, the water decomposition performance of the oxidation electrode of Example 6 was evaluated by photoelectrochemical measurement.

EXAMPLE 7

In the oxidation electrode of Example 7, the oxidation catalyst 102 was Ni—O, and the modified organic molecule 105 was 1-dodecyl-3-(2-triethoxysilylethyl)imidazolium tetrafluoroborate. More specifically, in the oxidation electrode of Example 1, the modified organic molecule 105 (in particular, the nitrogen cation 104 and alkyl group 106) was changed. In addition, the alkyl group 106 was changed from that in Example 2. In the same manner as in Example 1, the water decomposition performance of the oxidation electrode of Example 7 was evaluated by photoelectrochemical measurement.

EXAMPLE 8

In the oxidation electrode of Example 8, the oxidation catalyst 102 was Ni—O, and the modified organic molecule 105 was 1-octadecyl-3-(2-triethoxysilylethyl)imidazolium tetrafluoroborate. More specifically, in the oxidation electrode of Example 1, the modified organic molecule 105 (in particular, the nitrogen cation 104 and alkyl group 106) was changed. In addition, the alkyl group 106 was changed from that in Example 2. In the same manner as in Example 1, the water decomposition performance of the oxidation electrode of Example 8 was evaluated by photoelectrochemical measurement.

EXAMPLE 9

In the oxidation electrode of Example 9, the oxidation catalyst 102 was Ni—O, and the modified organic molecule 105 was aminopropyltrimethoxysilane. More specifically, in the oxidation electrode of Example 1, the modified organic molecule 105 was changed. In the same manner as in Example 1, the water decomposition performance of the oxidation electrode of Example 9 was evaluated by photoelectrochemical measurement.

COMPARATIVE EXAMPLE 1

In the oxidation electrode of Comparative Example 1, the oxidation catalyst 102 was Ni—O, and the modified organic molecule 105 was not formed. In the same manner as in Comparative Example 1, the water decomposition performance of the oxidation electrode of Example 1 was evaluated by photoelectrochemical measurement.

[Evaluation of Water Decomposition Performance in Examples 1 to 9]

As shown in FIG. 12, in Examples 1 to 5, the modified organic molecule 105 was appropriately changed without changing the oxidation catalyst 102. More specifically, in Examples 1 to 5, the nitrogen cation 104 was a quaternary cation, and the type was changed. The oxidation potential of the oxidation electrodes in Examples 1 to 5 was lower than the plane nickel oxide electrode in Comparative Example 1, even though the modified organic molecule 105 was changed. The reason for this is likely that the modified organic molecule 105 contributes to the improvement in water decomposition performance regardless of the material of the nitrogen cation 104. In other words, the modified organic molecule 105 promotes an oxidation reaction with lower energy.

In addition, in Examples 2 and 6 to 8, the oxidation catalyst 102 was not changed, and the modified organic molecule 105 was changed as needed. More specifically, in Examples 2 and 6 to 8, the alkyl group 106 (alkyl chain length) was changed. The oxidation potential of the oxidation electrodes in Examples 2, 6 to 8 was lower than the plane nickel oxide electrode in Comparative Example 1, even though the alkyl group 106 was changed. The reason for this is likely that the modified organic molecule 105 contributes to the improvement of water decomposition activity, regardless of the length of the alkyl chain. The modified organic molecule 106 has higher hydrophobicity with increased length of the alkyl chain, and thus contributes less to improvement in the water decomposition activity.

In addition, in Example 9, the oxidation catalyst 102 was not changed from that in Examples 1 to 8, the nitrogen cation 104 was amine, and the alkyl group 106 was not bonded to the amine (primary nitrogen cation). As shown in Example 9, the oxidation potential was lower than the plane nickel oxide electrode in Comparative Example 1, even though the modified organic molecule 105 contained a primary nitrogen cation, and was free from the alkyl group 106. The reason for this is likely that the inclusion of polar functional groups such as an amino group in the modified organic molecule 105 contributes to improvement in water decomposition activity. However, the contribution to the activity improvement was lower than that of the quaternary ammonium cation (Example 1).

Even if the alkyl group 106 is bonded to the amine, a similar result to Example 9 is obtained (N-methylaminopropyltrimethoxysilane, secondary nitrogen cation).

In the next, using FIG. 13, Examples 10 to 16 are described below.

EXAMPLE 10

In the oxidation electrode of Example 10, the oxidation catalyst 102 was cobalt oxide (Co—O), and the modified organic molecule 105 was 1-(2-ethylphosphonyl)-3-methylimidazolium tetrafluoroborate.

(Making of Oxidation Electrode)

Firstly, a collector 101 provided with an FTO substrate (150 mm×250 mm, thickness 0.5 mm) was immersed in a cobalt chloride aqueous solution at 95° C. containing dissolved urea, and kept therein for 1 hour. As a result of this, a precursor of the oxidation catalyst deposited from the aqueous solution was formed on the collector 101. Secondly, the collector 101 was burned in air at 350° C., whereby an oxidation catalyst 102 was formed on the surface of the collector 101. Formation of the oxidation catalyst 102 can be confirmed by observation using an electron microscope. As a result of the observation, the oxidation catalyst 102 has a uniform film thickness in the plane direction, and the film thickness is 100 nm.

Subsequently, the modified organic molecule 105 is bonded to the surface of the oxidation catalyst 102. The solution of 1-(2-ethylphosphonyl)-3-methylimidazolium tetrafluoroborate as the modified organic molecule 105 is an ethanol solution having a concentration of 10 mM. When the oxidation catalyst 102 is immersed in the solution for 30 minutes, the modified organic molecule 105 is bonded to the oxidation catalyst 102. Thereafter, the oxidation catalyst 102 is taken out from the solution of the modified organic molecule 105, washed with ethanol, and dried in a nitrogen stream, whereby an oxidation electrode is formed.

The bonding between the oxidation catalyst 102 and the modified organic molecule 105 can be confirmed by the same method as in Example 1.

(Measurement of Water Decomposition Performance)

In the same manner as in Example 1, the water decomposition performance of the oxidation electrode of Example 10 was evaluated by photoelectrochemical measurement.

EXAMPLE 11

In the oxidation electrode of Example 11, the oxidation catalyst 102 was Co—O, and the modified organic molecule 105 was 1-ethyl-3-(2-ethylphosphonyl)imidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 11 was evaluated by photoelectrochemical measurement.

EXAMPLE 12

In the oxidation electrode of Example 12, the oxidation catalyst 102 was Co—O, and the modified organic molecule 105 was 1-butyl-3-(2-ethylphosphonyl)imidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 12 was evaluated by photoelectrochemical measurement.

EXAMPLE 13

In the oxidation electrode of Example 13, the oxidation catalyst 102 was Co—O, and the modified organic molecule 105 was 1-(2-ethylphosphonyl)-3-hexylimidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 13 was evaluated by photoelectrochemical measurement.

EXAMPLE 14

In the oxidation electrode of Example 14, the oxidation catalyst 102 was Co—O, and the modified organic molecule 105 was 1-(2-ethylphosphonyl)-3-octylimidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 14 was evaluated by photoelectrochemical measurement.

EXAMPLE 15

In the oxidation electrode of Example 15, the oxidation catalyst 102 was Co—O, and the modified organic molecule 105 was 1-dodecyl-3-(2-ethylphosphonyl)imidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 15 was evaluated by photoelectrochemical measurement.

EXAMPLE 16

In the oxidation electrode of Example 16, the oxidation catalyst 102 was Co—O, and the modified organic molecule 105 was 1-(2-ethylphosphonyl)-3-octadecylimidazolium tetrafluoroborate. More specifically, in the oxidation electrode of Example 10, the modified organic molecule 105 (in particular, the alkyl group 106) was changed. In the same manner as in Example 1, the water decomposition performance of the oxidation electrode of Example 16 was evaluated by photoelectrochemical measurement.

COMPARATIVE EXAMPLE 2

In the oxidation electrode of Comparative Example 2, the oxidation catalyst 102 was Co—O, and the modified organic molecule 105 was not formed. In the same manner as in Example 1, the water decomposition performance of the oxidation electrode of Comparative Example 2 was evaluated by photoelectrochemical measurement.

[Evaluation of Water Decomposition Performance in Examples 10 to 16]

As shown in FIG. 13, in Examples 10 to 16, the modified organic molecule 105 was changed as appropriate, without changing the oxidation catalyst 102. More specifically, in Examples 10 to 16, the alkyl group 106 (the length of the alkyl chain) of the modified organic molecule 105 was changed. The oxidation potential of the oxidation electrodes in Examples 10 to 16 was lower than the plane cobalt oxide electrode in Comparative Example 2, even though the alkyl group 106 was changed. The reason for this is likely that the modified organic molecule 105 contributes to the improvement of water decomposition activity regardless of the alkyl group 106 of the modified organic molecule 105. The modified organic molecule 105 has higher hydrophobicity with increased length of the alkyl chain, and thus contributes less to improvement in the water decomposition activity.

In the next, Examples 17 to 25 and Comparative Example 3 are described below using FIG. 14.

EXAMPLE 17

In the oxidation electrode of Example 17, the oxidation catalyst 102 was manganese oxide (Mn—O), and the modified organic molecule 105 was 1-methyl-4-(2-triethoxysilylethyl)pyridinium tetrafluoroborate. In the same manner as in Example 1, the water decomposition performance of the oxidation electrode of Example 17 was evaluated by photoelectrochemical measurement.

EXAMPLE 18

In the oxidation electrode of Example 18, the oxidation catalyst 102 was Mn—O, and the modified organic molecule 105 was 1-methyl-4-(2-triethoxysilylethyl)pyridinium tetrafluoroborate. More specifically, in the oxidation electrode of Example 17, the modified organic molecule 105 (in particular, the counter anion 107) was changed. In the same manner as in Example 1, the water decomposition performance of the oxidation electrode of Example 18 was evaluated by photoelectrochemical measurement.

EXAMPLE 19

In the oxidation electrode of Example 19, the oxidation catalyst 102 was Mn—O, and the modified organic molecule 105 was 1-hexyl-4-(2-triethoxysilylethyl)pyridinium dicyanamide. More specifically, in the oxidation electrode of Example 17, the modified organic molecule 105 (in particular, the counter anion 107) was changed. In the same manner as in Example 1, the water decomposition performance of the oxidation electrode of Example 19 was evaluated by photoelectrochemical measurement.

EXAMPLE 20

In the oxidation electrode of Example 20, the oxidation catalyst 102 was manganese oxide (Mn—O), and the modified organic molecule 105 was 1-octyl-4-(2-triethoxysilylethyl)pyridinium hydrogen carbonate. More specifically, in the oxidation electrode of Example 17, the modified organic molecule 105 (in particular, the counter anion 107) was changed. In the same manner as in Example 1, the water decomposition performance of the oxidation electrode of Example 20 was evaluated by photoelectrochemical measurement.

EXAMPLE 21

In the oxidation electrode of Example 21, the oxidation catalyst 102 was manganese oxide (Mn—O), and the modified organic molecule 105 was 1-dodecyl-4-(2-triethoxysilylethyl)pyridinium nitrate. More specifically, in the oxidation electrode of Example 17, the modified organic molecule 105 (in particular, the counter anion 107) was changed. In the same manner as in Example 1, the water decomposition performance of the oxidation electrode of Example 21 was evaluated by photoelectrochemical measurement.

EXAMPLE 22

In the oxidation electrode of Example 22, the oxidation catalyst 102 was manganese oxide (Mn—O), and the modified organic molecule 105 was 1-octadecyl-4-(2-triethoxysilylethyl)pyridinium sulfate. More specifically, in the oxidation electrode of Example 17, the modified organic molecule 105 (in particular, the counter anion 107) was changed. In the same manner as in Example 1, the water decomposition performance of the oxidation electrode of Example 22 was evaluated by photoelectrochemical measurement.

EXAMPLE 23

In the oxidation electrode of Example 23, the oxidation catalyst 102 was manganese oxide (Mn—O), and the modified organic molecule 105 was 1-methyl-4-(2-triethoxysilylethyl)pyridinium borate. More specifically, in the oxidation electrode of Example 17, the modified organic molecule 105 (in particular, the counter anion 107) was changed. In the same manner as in Example 1, the water decomposition performance of the oxidation electrode of Example 23 was evaluated by photoelectrochemical measurement.

EXAMPLE 24

In the oxidation electrode of Example 24, the oxidation catalyst 102 was manganese oxide (Mn—O), and the modified organic molecule 105 was 1-ethyl-4-(2-triethoxysilylethyl)pyridinium phosphate. More specifically, in the oxidation electrode of Example 17, the modified organic molecule 105 (in particular, the counter anion 107) was changed. In the same manner as in Example 1, the water decomposition performance of the oxidation electrode of Example 24 was evaluated by photoelectrochemical measurement.

EXAMPLE 25

In the oxidation electrode of Example 25, the oxidation catalyst 102 was manganese oxide (Mn—O), and the modified organic molecule 105 was 1-hexyl-4-(2-triethoxysilylethyl)pyridinium perchlorate. More specifically, in the oxidation electrode of Example 17, the oxidation catalyst 102 and modified organic molecule 105 were changed. In the same manner as in Example 1, the water decomposition performance of the oxidation electrode of Example 25 was evaluated by photoelectrochemical measurement.

COMPARATIVE EXAMPLE 3

In the oxidation electrode of Comparative Example 3, the oxidation catalyst 102 was manganese oxide (Mn—O), and the modified organic molecule 105 was not formed. In the same manner as in Example 1, the water decomposition performance of the oxidation electrode of Comparative Example 3 was evaluated by photoelectrochemical measurement.

[Evaluation of Water Decomposition Performance in Examples 17 to 25]

As shown in FIG. 14, in Examples 17 to 25, the modified organic molecule 105 was changed as appropriate, without changing the oxidation catalyst 102. More specifically, in Examples 17 to 25, the counter anion 107 of the modified organic molecule 105 was changed. The oxidation potential of the oxidation electrodes in Examples 17 to 25 was lower than the plane manganese oxide electrode in Comparative Example 3, even though the counter anion 107 was changed. The reason for this is likely that the modified organic molecule 105 contributes to the improvement of water decomposition activity, regardless of the counter anion 107 of the modified organic molecule 105. The counter anion 107 influences the hydrophilicity of the modified organic molecule 105. In addition, the chloride and tetrafluoroborate anion particularly contributed to the activity improvement, because they have high hydrophilicity.

In the next, Examples 26 to 35 and Comparative Example 1 to 10 are described below using FIG. 15.

EXAMPLE 26

In the oxidation electrode of Example 26, the oxidation catalyst 102 was Mn—O, and the modified organic molecule 105 was 1-(2-ethylphosphonyl)-1-octadecyl piperidinium hydrogen carbonate. In the same manner as in Example 1, the water decomposition performance of the oxidation electrode of Example 26 was evaluated by photoelectrochemical measurement.

EXAMPLE 27

In the oxidation electrode of Example 27, the oxidation catalyst 102 was iron oxide (Fe—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 27 was evaluated by photoelectrochemical measurement.

EXAMPLE 28

In the oxidation electrode of Example 28, the oxidation catalyst 102 was Co—O, and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 28 was evaluated by photoelectrochemical measurement.

EXAMPLE 29

In the oxidation electrode of Example 29, the oxidation catalyst 102 was Ni—O, and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 29 was evaluated by photoelectrochemical measurement.

EXAMPLE 30

In the oxidation electrode of Example 30, the oxidation catalyst 102 was iridium oxide (Ir—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 30 was evaluated by photoelectrochemical measurement.

EXAMPLE 31

In the oxidation electrode of Example 28, the oxidation catalyst 102 was tin oxide (Sn—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 31 was evaluated by photoelectrochemical measurement.

EXAMPLE 32

In the oxidation electrode of Example 32, the oxidation catalyst 102 was indium oxide (In—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 32 was evaluated by photoelectrochemical measurement.

EXAMPLE 33

In the oxidation electrode of Example 33, the oxidation catalyst 102 was ruthenium oxide (Ru—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 33 was evaluated by photoelectrochemical measurement.

EXAMPLE 34

In the oxidation electrode of Example 34, the oxidation catalyst 102 was a binary oxide of ruthenium oxide and indium oxide (Ru-In—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, the water decomposition performance of the oxidation electrode of Example 34 was evaluated by photoelectrochemical measurement.

EXAMPLE 35

In the oxidation electrode of Example 35, the oxidation catalyst 102 was a ternary oxide of cobalt oxide, nickel oxide, and iron oxide (Co—Ni—Fe—O), and the modified organic molecule 105 was 1-(2-ethylphosphonyl)-1-octadecyl piperidinium hydrogen carbonate. More specifically, in the oxidation electrode of Example 26, the oxidation catalyst 102 was changed. In the same manner as in Example 1, water decomposition performance of the oxidation electrode of Example 35 was evaluated by photoelectrochemical measurement.

COMPARATIVE EXAMPLE 4

In the oxidation electrode of Comparative Example 4, the oxidation catalyst 102 was Fe—O, and the modified organic molecule 105 was not formed. In the same manner as in Example 1, the water decomposition performance of the oxidation electrode of Comparative Example 4 was evaluated by photoelectrochemical measurement.

COMPARATIVE EXAMPLE 5

In the oxidation electrode of Comparative Example 5, the oxidation catalyst 102 was Ir—O, and the modified organic molecule 105 was not formed. In the same manner as in Example 1, the water decomposition performance of the oxidation electrode of Comparative Example 5 was evaluated by photoelectrochemical measurement.

COMPARATIVE EXAMPLE 6

In the oxidation electrode of Comparative Example 6, the oxidation catalyst 102 was Sn—O, and the modified organic molecule 105 was not formed. In the same manner as in Example 1, the water decomposition performance of the oxidation electrode of Comparative Example 6 was evaluated by photoelectrochemical measurement.

COMPARATIVE EXAMPLE 7

In the oxidation electrode of Comparative Example 7, the oxidation catalyst 102 was In—O, and the modified organic molecule 105 was not formed. In the same manner as in Example 1, the water decomposition performance of the oxidation electrode of Comparative Example 7 was evaluated by photoelectrochemical measurement.

COMPARATIVE EXAMPLE 8

In the oxidation electrode of Comparative Example 8, the oxidation catalyst 102 was Ru—O, and the modified organic molecule 105 was not formed. In the same manner as in Example 1, the water decomposition performance of the oxidation electrode of Comparative Example 8 was evaluated by photoelectrochemical measurement.

COMPARATIVE EXAMPLE 9

In the oxidation electrode of Comparative Example 9, the oxidation catalyst 102 was Ru—In—O, and the modified organic molecule 105 was not formed. In the same manner as in Example 1, the water decomposition performance of the oxidation electrode of Comparative Example 9 was evaluated by photoelectrochemical measurement.

COMPARATIVE EXAMPLE 10

In the oxidation electrode of Comparative Example 10, the oxidation catalyst 102 was Co—Ni—Fe—O, and the modified organic molecule 105 was not formed. In the same manner as in Example 1, the water decomposition performance of the oxidation electrode of Comparative Example 10 was evaluated by photoelectrochemical measurement.

[Evaluation of Water Decomposition Performance in Examples 26 to 35]

As shown in FIG. 15, in Examples 26 to 35, the oxidation catalyst 102 was changed as appropriate, without changing the modified organic molecule 105. The oxidation potential of the oxidation electrodes in Examples 26 to 35 was lower than the plane oxide electrode having the same modified organic molecule 105 in Comparative Examples 1 to 10, even though the oxidation catalyst 102 was changed. The reason for this is likely that the modified organic molecule 105 contributes to the improvement of water decomposition activity regardless of the material of the oxidation catalyst 102.

In the next, as shown in FIG. 16, Examples 36 to 41 are described below.

EXAMPLE 36

In the oxidation electrode of Example 36, the oxidation catalyst 102 was Ru—O, and the modified organic molecule 105 was 1-(2-ethylphosphonyl)-1-methylpyrrolidinium tetrafluoroborate. In Example 36, amine oxidation inhibition performance (amine decomposition performance) is measured using the oxidation electrode in the photoelectrochemical cell and photoelectrochemical device.

(Making of Photoelectrochemical Device)

The photoelectrochemical cell was made by the following method. As a $CO_2$ reduction catalyst, Au is formed by sputtering on the substrate 11 at the backside of the multijunction solar cell 17. In addition, the oxidation catalyst layer 19 (the oxidation catalyst 102) is formed on the oxidation electrode layer 18 (the collector 101) at the front side of the multijunction solar cell 17 by the spray application method of dispersing nanoparticles of ruthenium oxide into an alcohol aqueous solution. Thereafter, in the same manner as in Example 10, the modified organic molecule 105 is formed on the oxidation catalyst 102. The photoelectrochemical cell thus made is cut into a size of 150 mm×250 mm.

(Measurement of Amine Decomposition Performance)

The concentration of the amine decomposed by incorporating the photoelectrochemical cell in the photoelectrochemical device was evaluated. The electrolytic solution was a 0.5 M potassium hydroxide aqueous solution ($CO_2$ saturated aqueous solution) containing 10% triethanolamine. The ion exchange membrane was an anion exchange membrane. Light of AM 1.5 (100 mW/cm$^2$) was irradiated from the oxidation catalyst layer 19 side using a solar simulator, and the concentration of the amine decomposition product contained in the electrolytic solution at the oxidation side was subjected to GC/MS quantitative analysis.

In addition, in the same manner, the concentration of the amine decomposition product of Comparative Examples without the formation of the modified organic molecule 105 was measured. In addition, the amine decomposition performance in Example 36 was determined as the concentration ratio of the amine decomposition product in Example 36 in comparison with Comparative Examples.

EXAMPLE 37

In the oxidation electrode of Example 37, the oxidation catalyst 102 was Ru—O, and the modified organic molecule 105 was 1-ethyl-1-(2-ethylphosphonyl)pyrrolidinium tetrafluoroborate. More specifically, in the oxidation electrode of Example 36, the modified organic molecule 105 (in particular, the alkyl group 106) was changed. In the same manner as in Example 36, the amine decomposition performance of the oxidation catalyst in Example 37 was evaluated. More specifically, the concentration ratio of the amine decomposition product of Example 37 with reference to Comparative Examples was determined.

EXAMPLE 38

In the oxidation electrode of Example 38, the oxidation catalyst 102 was Ru—O, and the modified organic molecule 105 was 1-(2-ethylphosphonyl)-1-hexyl pyrrolidinium tetrafluoroborate. More specifically, in the oxidation electrode of Example 36, the modified organic molecule 105 (in particular, the alkyl group 106) was changed. In the same manner as in Example 36, the amine decomposition performance of the oxidation catalyst in Example 38 was evaluated. More specifically, the concentration ratio of the amine decomposition product of Example 38 with reference to Comparative Examples was determined.

EXAMPLE 39

In the oxidation electrode of Example 39, the oxidation catalyst 102 was Ru—O, and the modified organic molecule 105 was 1-(2-ethylphosphonyl)-1-octyl pyrrolidinium tetrafluoroborate. More specifically, in the oxidation electrode of Example 36, the modified organic molecule 105 (in particular, the alkyl group 106) was changed. In the same manner as in Example 36, the amine decomposition performance of the oxidation catalyst in Example 39 was evaluated. More specifically, the concentration ratio of the amine decomposition product of Example 39 with reference to Comparative Examples was determined.

EXAMPLE 40

In the oxidation electrode of Example 40, the oxidation catalyst 102 was Ru—O, and the modified organic molecule 105 was 1-dodecyl-1-(2-ethylphosphonyl)pyrrolidinium tetrafluoroborate. More specifically, in the oxidation electrode of Example 36, the modified organic molecule 105 (in particular, the alkyl group 106) was changed. In the same manner as in Example 36, the amine decomposition performance of the oxidation catalyst in Example 40 was evaluated. More specifically, the concentration ratio of the amine decomposition product of Example 40 with reference to Comparative Examples was determined.

EXAMPLE 41

In the oxidation electrode of Example 41, the oxidation catalyst 102 was Ru—O, and the modified organic molecule 105 was 1-(2-ethylphosphonyl)-1-octadecyl pyrrolidinium tetrafluoroborate. More specifically, in the oxidation electrode of Example 36, the modified organic molecule 105 (in particular, the alkyl group 106) was changed. In the same manner as in Example 36, the amine decomposition performance of the oxidation catalyst in Example 41 was evaluated. More specifically, the concentration ratio of the amine decomposition product of Example 41 with reference to Comparative Examples was determined.

[Measurement of Amine Decomposition Performance in Examples 36 to 41]

As shown in FIG. 16, in Examples 36 to 41, the modified organic molecule 105 was changed as appropriate, without changing the oxidation catalyst 102. More specifically, in Examples 36 to 41, the modified organic molecule 105 was changed at the alkyl group 106. The amine decomposition performance of the oxidation electrodes in Examples 36 to 41 is lower than the amine decomposition performance of the oxidation electrode (Comparative Example) forming no modified organic molecule. The reason for this is likely that the modified organic molecule 105 contributes to the inhibition of amine decomposition, regardless of the material of the modified organic molecule 105 (in particular, the alkyl group 106). The longer the alkyl chain of the modified organic molecule 105, the more the approach of the amine to the oxidation catalyst is inhibited, and thus a likely higher decomposition inhibitory effect will be achieved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An oxidation electrode comprising:
a collector;
an oxidation catalyst formed on the collector; and
an organic molecule which is chemically bonded to the surface of the oxidation catalyst, and comprises a cationic functional group.

2. The electrode of claim 1, wherein the cationic functional group comprises a quaternary nitrogen cation.

3. The electrode of claim 2, wherein the quaternary nitrogen cation comprises at least one of ammonium cations, imidazole cations, pyridinium cations, piperidinium cations, and pyrrolidinium cations.

4. The electrode of claim 1, wherein the modified organic molecule further comprises at least one of alkyl groups having 1 to 20 carbon atoms.

5. The electrode of claim 1, wherein the modified organic molecule further comprises an anionic functional group having hydrophilicity.

6. The electrode of claim 5, wherein the anionic functional group comprises at least one of tetrafluoroborate anions, dicyanamide anions, hydrogen carbonate anions, nitrate anions, borate anions, sulfate anions, phosphate anions, perchlorate anions, and halogen anions.

7. The electrode of claim 1, wherein the modified organic molecule further comprises a reactive functional group binding the cationic functional group and the oxidation catalyst.

8. The electrode of claim 7, wherein the reactive functional group comprises at least one of a carboxylate group, a phosphonate group, a halogenated silyl group, and an alkoxysilyl group.

9. The electrode of claim 1, wherein the oxidation catalyst comprises at least one oxide of manganese, iron, cobalt, nickel, iridium, tin, indium, and ruthenium.

10. The electrode of claim 1, wherein the collector, oxidation catalyst, and modified organic molecule oxidize water in the electrolytic solution containing an amine or amine cation.

11. A photoelectrochemical device comprising;
a reduction electrode;
an oxidation electrode which comprises a collector, an oxidation catalyst formed on the collector, and an organic molecule chemically bonded to the surface of the oxidation catalyst and containing a cationic functional group; and
a power source element electrically connected to the reduction electrode and oxidation electrode.

12. The device of claim 11, wherein the power source element includes a semiconductor layer causing charge separation by light energy.

13. The device of claim 12, wherein the semiconductor layer is formed between the oxidation electrode and reduction electrode.

14. The device of claim 11, wherein the cationic functional group comprises a quaternary nitrogen cation.

15. The device of claim 14, wherein the quaternary nitrogen cation comprises at least one of ammonium cations, imidazole cations, pyridinium cations, piperidinium cations, and pyrrolidinium cations.

16. The device of claim 11, wherein the modified organic molecule further comprises at least one of alkyl groups having 1 to 20 carbon atoms.

17. The device of claim 11, wherein the modified organic molecule further comprises an anionic functional group having hydrophilicity.

18. The device of claim 17, wherein the anionic functional group comprises at least one of tetrafluoroborate anions, dicyanamide anions, hydrogen carbonate anions, nitrate anions, borate anions, sulfate anions, phosphate anions, perchlorate anions, and halogen anions.

19. The device of claim 11, wherein the modified organic molecule comprises a reactive functional group binding the cationic functional group and the oxidation catalyst.

20. The device of claim 19, wherein the reactive functional group comprises at least one of a carboxylate group, a phosphonate group, a halogenated silyl group, and an alkoxysilyl group.

\* \* \* \* \*